Nov. 9, 1965 S. W. SCHORUM 3,217,107

LINE CONCENTRATOR AND SIGNALING SYSTEM THEREFOR

Filed Feb. 27, 1961 19 Sheets-Sheet 1

INVENTOR.
Stanley W. Schorum

BY C. A. Gulbrandsen

Atty.

LINE CONCENTRATOR AND SIGNALING SYSTEM THEREFOR

Filed Feb. 27, 1961

INVENTOR.
Stanley W. Schorum
BY
C. A. Gulbrandsen
Atty.

LINE CONCENTRATOR AND SIGNALING SYSTEM THEREFOR

Filed Feb. 27, 1961

INVENTOR.
Stanley W. Schorum

BY C. A. Gulbrandsen
Atty.

Nov. 9, 1965 S. W. SCHORUM 3,217,107

LINE CONCENTRATOR AND SIGNALING SYSTEM THEREFOR

Filed Feb. 27, 1961 19 Sheets-Sheet 4

INVENTOR.
Stanley W. Schorum
BY
C. A. Gullbrandsen
Atty.

LINE CONCENTRATOR AND SIGNALING SYSTEM THEREFOR

Filed Feb. 27, 1961

INVENTOR.
Stanley W. Schorum

BY C. A. Gulbrandsen
Atty.

Nov. 9, 1965 S. W. SCHORUM 3,217,107

LINE CONCENTRATOR AND SIGNALING SYSTEM THEREFOR

Filed Feb. 27, 1961 19 Sheets-Sheet 6

INVENTOR.
Stanley W. Schorum

BY C. A. Gullbrandsen

Atty.

Nov. 9, 1965 S. W. SCHORUM 3,217,107

LINE CONCENTRATOR AND SIGNALING SYSTEM THEREFOR

Filed Feb. 27, 1961 19 Sheets-Sheet 7

INVENTOR.
Stanley W. Schorum
BY
C. A. Gulbrandsen
Atty.

LINE CONCENTRATOR AND SIGNALING SYSTEM THEREFOR

Filed Feb. 27, 1961 19 Sheets-Sheet 8

INVENTOR.
Stanley W. Schorum

BY
C. A. Gulbrandsen
Atty.

LINE CONCENTRATOR AND SIGNALING SYSTEM THEREFOR

INVENTOR.
Stanley W. Schorum

BY
C. A. Gulbrandsen
Atty.

Nov. 9, 1965 S. W. SCHORUM 3,217,107

LINE CONCENTRATOR AND SIGNALING SYSTEM THEREFOR

Filed Feb. 27, 1961 19 Sheets-Sheet 10

INVENTOR.
Stanley W. Schorum
BY
C. A. Gulbrandsen
Atty.

Nov. 9, 1965 S. W. SCHORUM 3,217,107

LINE CONCENTRATOR AND SIGNALING SYSTEM THEREFOR

Filed Feb. 27, 1961 19 Sheets-Sheet 11

INVENTOR.
Stanley W. Schorum
BY
C. A. Gulbrandsen
Atty.

INVENTOR.
Stanley W. Schorum
BY
C. A. Gulbrandsen
Atty.

LINE CONCENTRATOR AND SIGNALING SYSTEM THEREFOR

Filed Feb. 27, 1961 19 Sheets-Sheet 13

INVENTOR.
Stanley W. Schorum
BY
[signature]
Atty

INVENTOR.
Stanley W. Schorum
BY
C. A. Gulbrandsen
Atty.

INVENTOR.
Stanley W. Schorum
BY
C. A. [signature]
Atty.

INVENTOR.
Stanley W. Schorum
BY
C. A. Gulbrandsen
Atty.

INVENTOR.
Stanley W. Schorum
BY
C. A. Gulbransen
Atty.

Nov. 9, 1965 S. W. SCHORUM 3,217,107

LINE CONCENTRATOR AND SIGNALING SYSTEM THEREFOR

Filed Feb. 27, 1961 19 Sheets-Sheet 18

INVENTOR.
Stanley W. Schorum

BY C. A. [signature]
Atty.

INVENTOR.
Stanley W. Schorum
BY
C. A. Gullbrandsen
Atty.

United States Patent Office 3,217,107
Patented Nov. 9, 1965

3,217,107
LINE CONCENTRATOR AND SIGNALING SYSTEM THEREFOR

Stanley W. Schorum, Park Ridge, Ill., assignor to Automatic Electric Laboratories, Inc., Northlake, Ill., a corporation of Delaware
Filed Feb. 27, 1961, Ser. No. 91,694
21 Claims. (Cl. 179—18)

This invention relates to a line concentrator system and to a signalling system therefor, and more particularly to a universal line concentrator system using static type switching elements in the talking connections and using time division multiplex signalling for the transmission of control signals between the central office unit and the remote unit. The time division multiplex signalling may also be used in other systems, such as data transmission.

In conventional telephone systems each substation normally requires a pair of wires to connect it with the central office. These wires or lines are the most inefficiently utilized portions of the telephone system because on the average they are utilized infrequently compared to the usage of the common equipment in the central office. Moreover, for a substation which is located at a considerable distance from the central office the cost of these wires is substantial. In fact, in the present day telephone plant a large portion of the cost of installation and operation relates to the wires used in the subscriber loops between the substations and the central office. The utilization of a line concentrator system becomes attractive where the outside plant costs are high and the distances between groups and substations and the central office are large while the number of substations and the amount of local interconnecting traffic among the substations are not adequate to justify their connection to a separate central office. Line concentrator systems are also utilized when cable is unavailable, or to give temporary service.

Some of the known line concentrator systems require the use of electromechanical switches and relays for making the necessary connections and for controlling the equipment. This presents several serious problems in the remote equipment. It requires that comparatively large amounts of power be available for operating the relays and switches; and in addition, the periodic maintenance required by relay type equipment is more costly in remote equipment than that required by centralized equipment. Another disadvantage is that the time required to connect the subscriber's telephone to the central office equipment increases the time required to convey dial tone and other service to the subscriber's telephone.

It is possible to avoid the difficulties of electromechanical equipment by providing an all-electronic switching system. In such a system static switching elements such as gas tubes, transistors, or four-layer diodes may be used to establish the connections. Such a system would require relatively little power, little or no periodic maintenance, and has an operating time which is negligible by comparison with electromechanical equipment.

However in a system using electronic type switching, the static switching elements are generally capable of handling only a small amount of power, and therefore cannot handle the necessary signalling current such as is required for ringing the subscriber's telephone. Therefore in most telephone systems using electronic switching, special telephone subsets are provided using tone type ringers, special amplifier circuits, and so forth. However the investment in telephone subsets of the present type using conventional ringers is considerable, and it might not be economically justified to replace all of these telephones when concentrators are provided.

Also many of the known concentrator systems are designed for use with a specific type of main exchange telephone equipment. However in many cases it is desirable to use a concentrator with existing main exchange equipment without requiring any modification of that equipment.

The general object of this invention is to provide an electronic line concentrator system for use in connecting conventional telephone substations having standard ringers and dials with their individual line terminals of any conventional central office switching equipment.

In most line concentrator systems a few of the conductors interconnecting the remote concentrator equipment with the central office equipment are used for the transmission of control signals. This signalling may comprise a time division multiplex arrangement. However since these control conductors are ordinary cable pairs or open wire lines, they introduce a considerable amount of propagation delay in the transmission of pulses. Therefore it is usually necessary to provide relatively long time slots to insure that the information between the subscriber line terminals and the central office equipment terminals remain in correct correspondence. This is particularly true if a scan pulse must be sent and a reply pulse then returned during the time slot. While such an arrangement may be satisfactory if the information to be signalled changes condition relatively infrequently and may therefore be sampled at a slow rate, such as for service request signals, it is unsatisfactory for signals such as dialing which must be sampled at a high repetition rate.

A specific object of the invention is to provide a relatively high rate time division multiplex signalling arrangement for use in a line concentrator system.

According to a feature of the invention, a time division multiplex signalling arrangement is provided comprising central equipment and remote equipment interconnected by transmission conductors, with separate distributors at the two equipments to supply enabling pulses in respective time slots of repetitive frames to corresponding transmission gates at the two equpments, the set of gates at one equipment being used for the transmission of signal pulses, and the corresponding set of gates at the other equipment being used to receive these pulses; with an arrangement for driving the two distributors from the same master source so that they operate at the same repetition rate, and including a phase shift circuit device interposed between the master source and the second one of the distributors so that the enabling pulses from it are delayed a given amount with respect to the enabling pulses supplied by the first distributor, the delay corresponding to the propagation delay time of the transmission line, so that thereby the signal pulses transmitted at the transmitting gates under the control of the enabling pulses supplied by the first distributor arrive at the receiving gates in coincidence with the corresponding enabling pulses supplied by the second distributor. There is further provided a third distributor in the same equipment as the first distributor, supplied from said master source through another phase shift circuit device so that its enabling pulses are delayed with respect to the enabling pulses of the second distributor, so that signal pulses may be transmitted from the equipment which is controlled by the second distributor, and received at the other equipment in the correct time slots under control of the enabling pulses from the third distributor.

The time division multiplex signalling arrangement may further include apparatus for generating a synchronizing pulse once per frame to reset all of the distributors, to insure that the time slots remain in correct correspondence. The signalling arrangement includes provision for supplying the synchronizing pulse directly to the first distributor, transmitting it over the transmission line to the second distributor, and also transmitting it back over the transmission line to the third distributor, so that the synchronizing pulses undergo the same propagation delay as the signal pulses and are therefore supplied to the second and third distributors in the correct time relation to reset them at the desired time in the frames.

Another feature of the invention relates to a circuit arrangement in the line circuits terminating the subscriber lines at the remote location. It is necessary to supply direct current to the subscriber lines and to detect the open or closed loop condition of the line for service request, dialing and answer supervision purposes. The direct current is supplied to the two sides of the lines through respective inductors. According to the invention a switching device is connected in series between one of said inductors and of the corresponding pole of the direct current source, this switching device presenting a normally high impedance to effectively disconnect that pole of the source from the line, with a call detecting circuit connected to the same side of the line, with the output from the call detector connected to control the switching device to provide a low impedance path from the direct current source to the line in response to a closed loop, and to present a high impedance path in response to an open loop. A signal is also transmitted to control equipment to indicate the condition of the line.

Another feature relates to the determination of the pulse width of pulses produced by transistor blocking oscillators used in the control circuits at both the central and remote equipment.

The above-mentioned and other objects and features of this invention and the manner of attaining them will become more apparent, and the invention itself will be best understood, by reference to the following description of embodiments of the invention taken in conjunction with the accompanying drawings comprising FIGS. 1 to 23 wherein:

FIG. 1 is a system block diagram of an electronic line concentrator system;

FIGS. 2–8 comprise a functional block diagram of the concentrator system shown in FIG. 1;

Figure 22:
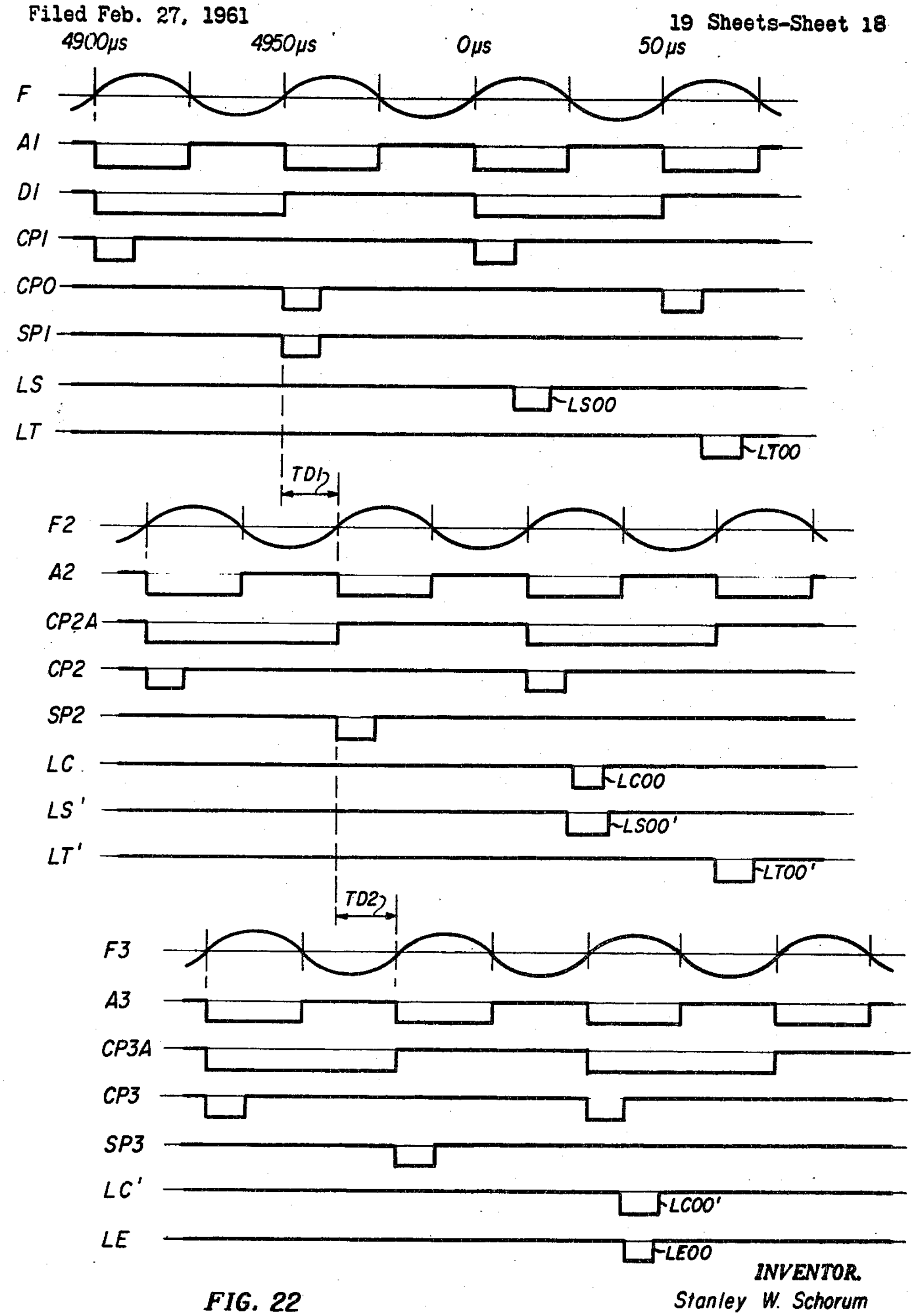
Figure 23:
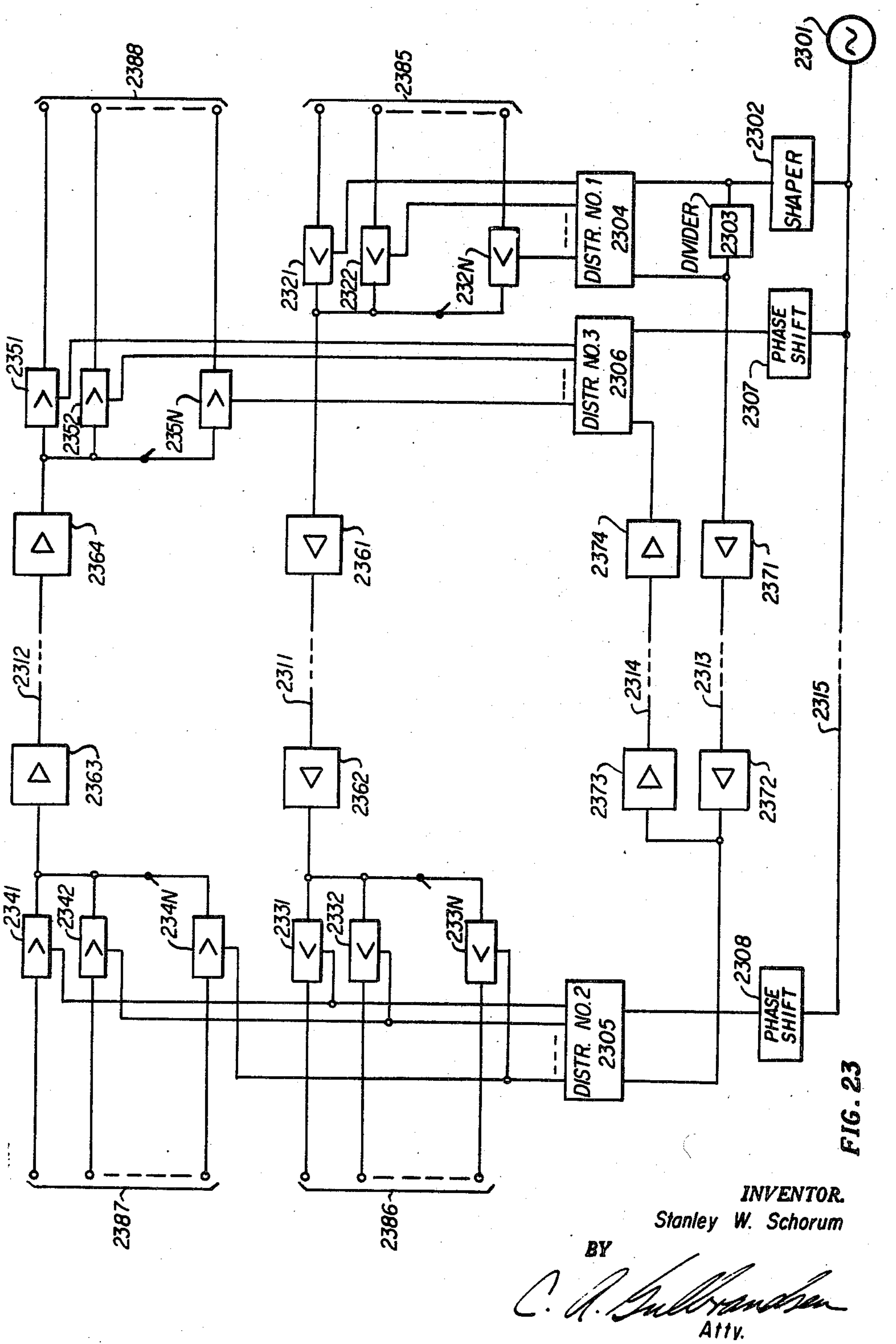

FIG. 22 comprises a series of graphs showing the waveforms occurring at various points in the system; and FIG. 23 is a block diagram of a generalized embodiment of the time division multiplex signalling arrangement.

GENERAL DESCRIPTION

Figures 1, 9:
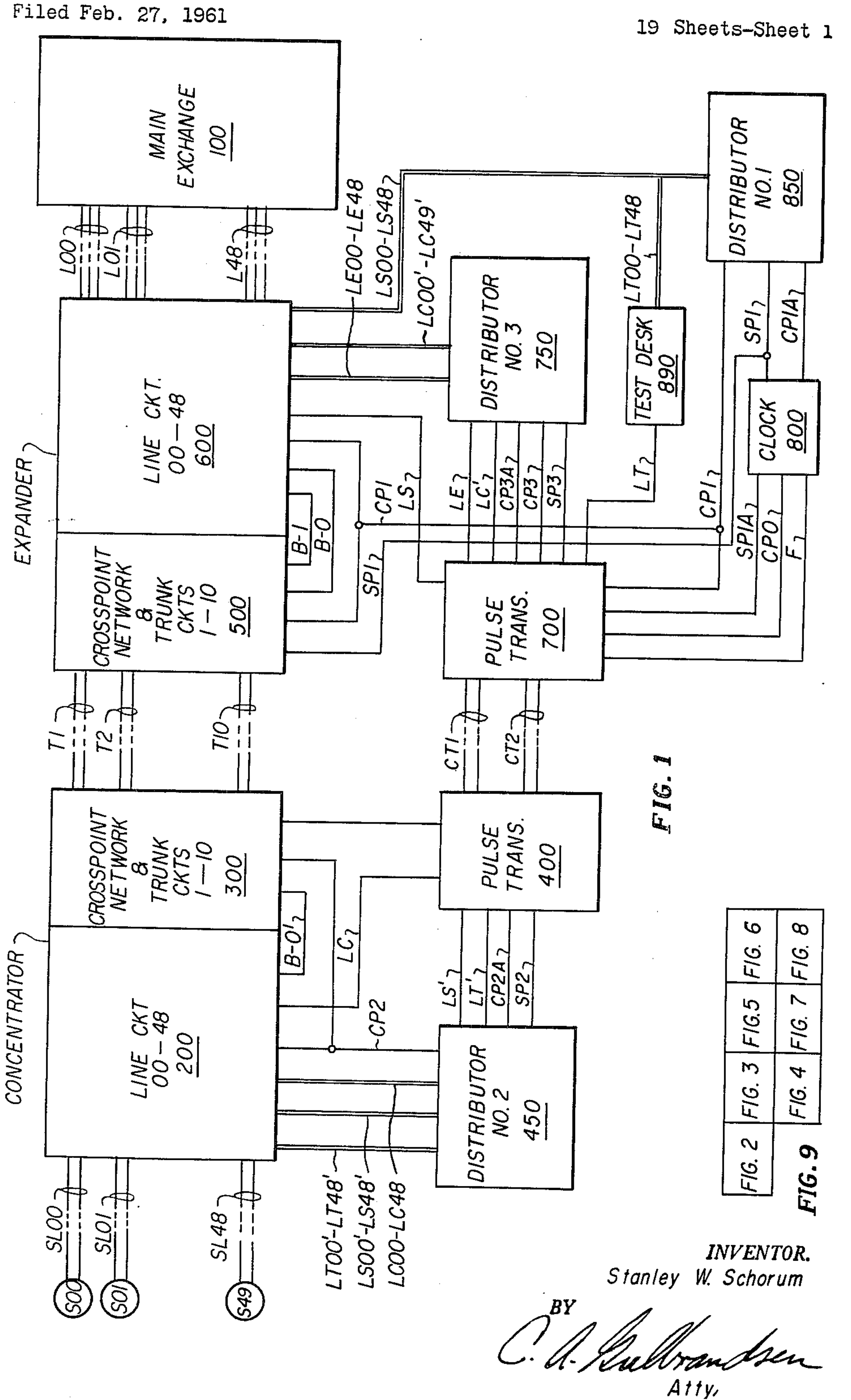
FIG. 9 is a diagram showing how

Referring to FIG. 1, which is a system block diagram, the universal line concentrator system comprises equipment interconnecting forty nine subscriber lines SL00–SL48 at a remote location with their individual line terminations L00–L48 located at the central office. The concentrator equipment located at the remote location and the expander equipment located at the central office are interconnected by ten trunks T1–T10 which provide talking paths and two control trunks CT1 and CT2 which provide signalling paths. In the concentrator equipment the unit 200 comprises forty nine line circuits individually connected to the subscriber lines SL00–SL48, and the unit 300 includes ten trunk circuits individually connected to the ten trunks T1–T10. The unit 300 also includes a crosspoint network for selectively connecting any one of the forty nine line circuits to any one of the ten trunk circuits. Likewise in the expander equipment at the central office, the unit 600 comprises forty nine line circuits individually connected to the line terminations L00–L48, and the unit 500 includes ten trunk circuits individually connected to the ten trunks T1–T10. The unit 500 also includes a crosspoint network for selectively connecting any one of the forty nine expander line circuits to any one of the ten expander trunk circuits.

The forty nine line terminals L00–L48 appear to the main exchange 100 of the telephone system just as if they were ordinary subscriber lines terminating thereat. In other words, as far as the telephone system is concerned, the line terminals L00–L48 are the subscriber lines. The concentrator system may be utilized with any of the conventional types of telephone systems. Also the subscriber stations S00–S48 may use conventional telephone subset equipment with no special requirements imposed thereon. That is, the ringers, dials, and transmission circuits of the subsets may be of the conventional type. Thus existing equipment may be used both at the main exchange and at the subscriber stations.

The line concentrator system itself is of the electronic type, using static components, particularly those of the solid state type such as transistors and diodes, to obtain the many advantages such as high speed, dependability, long life, etc. of such components. The switching elements of the crosspoint network may be devices such as transistors or four-layer diodes.

The line concentrator system is provided with a time division multiplex signalling arrangement for transmitting line-seizure and ringing signals originating at the main exchange over control trunk CT1 to the remote location, and to transmit service request and dialing signals originating as loop-closure signals at the subscriber stations over control trunk CT2 to the central office.

The signalling arrangement uses a time division multiplex frame recurring once every five milliseconds, divided into fifty time slots of 100 microseconds each. All of the pulses are ultimately derived from a 20-kilocycle per second sine wave oscillator in the clock 800. The sine wave signal is amplified and supplied to lead F. Pulse shaping circuits in the clock supply a 10-microsecond pulse on lead CP1A at the beginning of each time slot to drive the first distributor 850, a 10-microsecond pulse on lead CP0 in the middle of each time slot, and a synchronizing pulse supplied near the end of each frame to leads SP1A and SP1. The distributor 850 supplies scanning pulses during each of the time slots in succession and supplies them over the forty nine leads LS00–LS48 to the individual line circuits in the block 600. The distributor 850 is reset at the end of each frame by the synchronizing pulse on lead SP1. In each line circuit the scanning pulse is either blocked or passed by a gate circuit to the common conductor LS. These line-seizure pulses appearing on lead LS are repeated by the pulse transmission and reshaping circuits 700 to the control trunk CT1, and then repeated by the pulse transmission and reshaping circuits 400 to the lead LS′.

The remote equipment includes a second distributor 450 which supplies enabling pulses in the forty nine time slots in succession. This distributor 450 includes a routing matrix for directing the pulses appearing on lead LS′ over the individual one of the forty nine leads LS00′–LS48′ to the individual line circuits in block 200. The distributor 450 also includes a matrix for supplying scanning pulses in succession to the leads LC00–LC48 to the individual line circuits in block 200. In each line circuit the scanning pulse is either blocked or passed by a gate to the common lead LC. These loop-closure pulses appearing on lead LC are repeated by the pulse transmission and reshaping circuits 400 to control trunk CT2, and repeated by the pulse transmission and reshaping circuits 700 to the lead LC′.

The expander unit includes a third distributor 750 which also includes a counting arrangement for generating enabling pulses in the forty nine time slots in succession. This distributor 750 includes a routing matrix for directing the pulses on lead LC′ over the respective ones of the forty nine leads LC00′–LC48′ to the individual line circuits in block 600. A pulse occurring once per time slot is also generated by the pulse transmission and reshaping circuit 700 and routed by the distributor 750 to the individual leads LE00–LE48 to the individual line circuits in block 600. This LE pulse is used for resetting purposes in the line circuits if no LC′ pulse is received.

For routine testing of the subscriber lines SL00–SL48, an arrangement is prvoided for connecting any one of the subscriber lines over a test trunk to routining equipment in the central office. For this purpose the scanning pulses from distributor 850 are supplied over the forty nine leads LT00–LT48 to a test desk 890, and selectively applied to the common conductor LT. These line-test pulses are transmitted like the pulses on lead LS but in a different portion of the individual time slots, over the trunk CT1 to the conductor LT′ at the concentrator equipment and routed by the distributor 450 over the individual conductors LT00′–LT48′ to the individual line circuits in the block 200.

According to a principal feature of the invention, the time bases of the second distributor 450 and the third distributor 750 are shifted with respect to that of the first disrtributor 850, so that the enabling pulses in each distributor will be in coincidence with the received signal pulses. The three distributors are also synchronized to run at the same rate, and to maintain correspondence of the time slots in each frame. This is accomplished by transmitting the 20-kilocycle sine wave signal on lead F over the phantom of the control trunks CT1 and CT2, and utilizing it in the pulse transmission and reshaping circuits 400 to generate a clock pulse recurring once per time slot and supplied on lead CP2A to the second distributor 450. The shifting of the time base is obtained by a phase shifting arrangement in the pulse transmission and reshaping circuits 400. The signal from lead F is also phase shifted by equipment in the pulse transmission and reshaping circuits 700, to drive pulse-generator circuits for applying pulses occurring once each time slot, which are supplied over lead CP3A to drive the third distributor 750. The time base of the distributor 750 is shifted by approximately twice the amount that the time base for distributor 450 is shifted.

Also the synchronizing pulses on lead SP1A are transmitted over the control trunk CT1. At the concentrator equipment this pulse as received is supplied to lead SP2 and is also retransmitted over control trunk CT2 and supplied to the lead SP3. These synchronizing pulses appearing on the leads SP2 and SP3 are used to reset the respective distributors 450 and 750 at the end of each frame.

The block 500 of the expander includes equipment for selecting an idle one of the ten trunks T1–T10 and supplying a marking signal to the corresponding crosspoints of the crosspoint network. The identity of the selected trunk is transmitted to the concentrator equipment using a phantom arrangement on the first five trunks T1–T5, and is used in the block 300 of the concentrator to mark the crosspoints of the concentrator crosspoint network.

DETAILED DESCRIPTION

FIGS. 2–8, arranged as shown in FIG. 9, comprise a functional block diagram of the electronic line concentrator system. FIGS. 10–21 are detailed schematic diagrams of portions of the system. FIG. 22 shows a series of graphs of the master clock signal and of the pulses used in the system.

This system uses diode and transistor logic in which the true or "1" condition is represented by a negative signal usually −8 volts, and the false or "0" condition is represented by ground potential.

*Concentrator line circuit*

Figure 2:
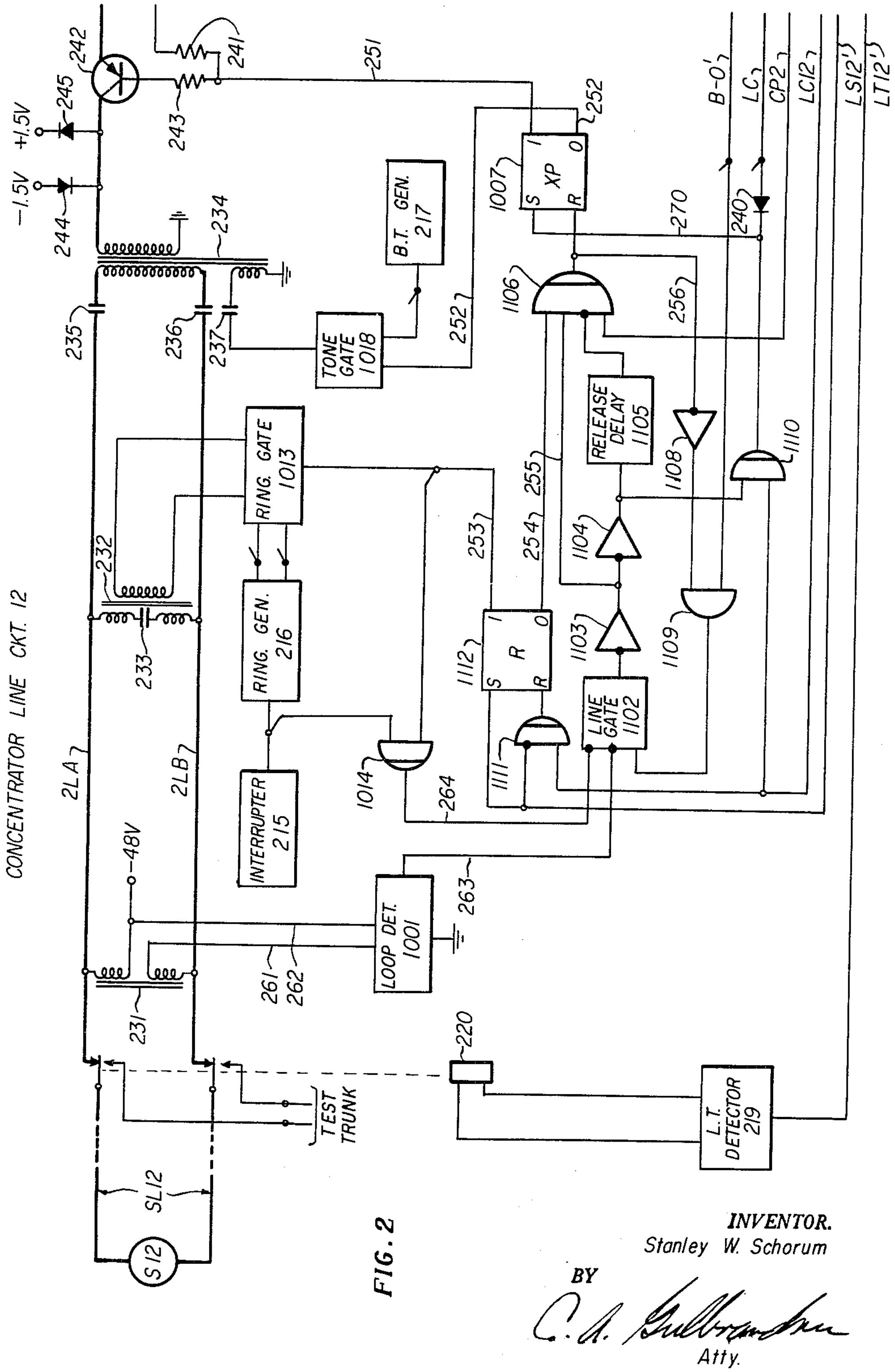
FIGS. 2–8 are to be arranged together.
Figure 10:
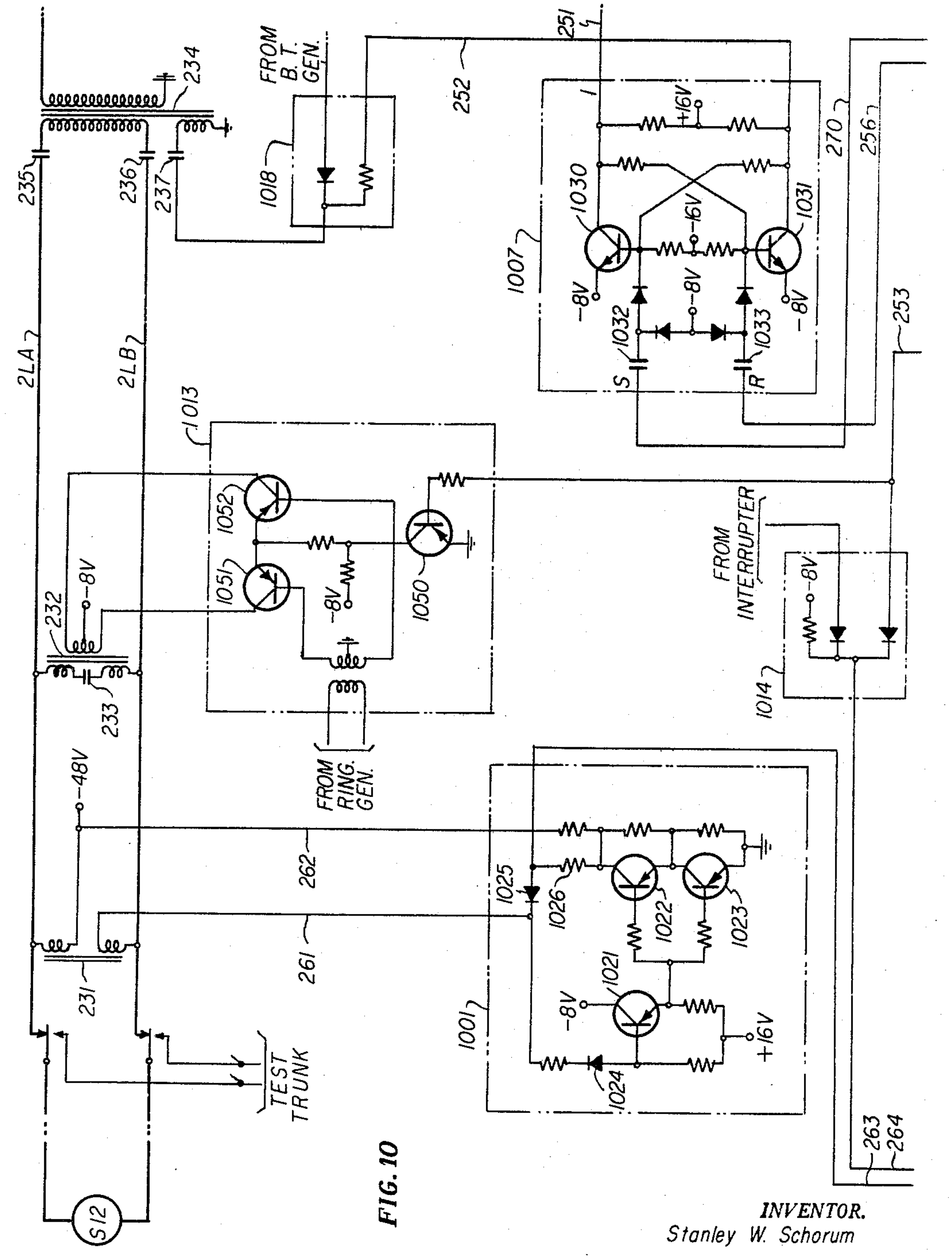
FIGS. 10–21 are schematic diagrams of various of the units shown in FIGS. 2–8.
Figure 11:
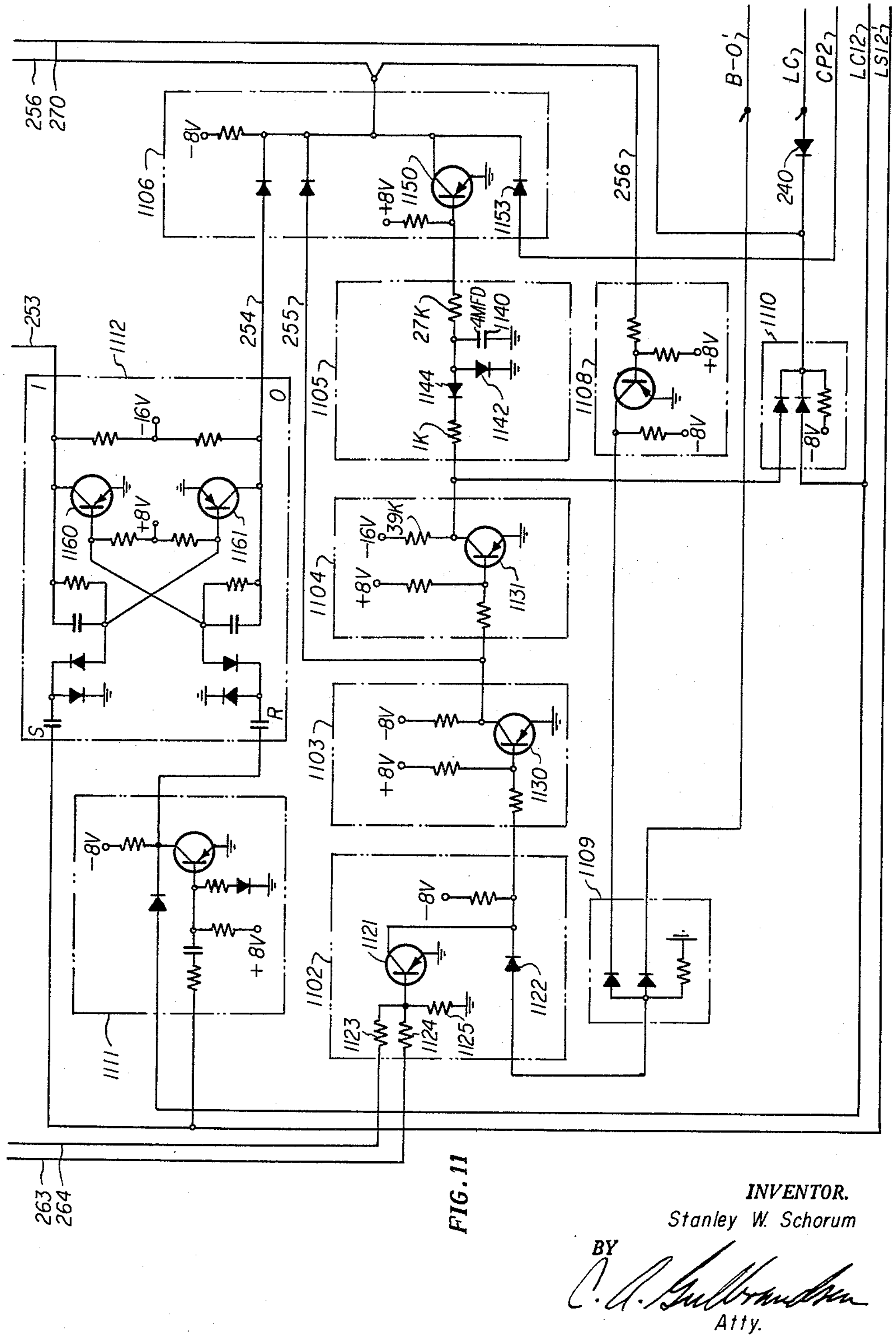

FIG. 2 is a functional block diagram, and FIGS. 10 and 11 with FIG. 10 arranged above FIG. 11 comprise a schematic diagram of the concentrator line circuit serving subscriber line SL12. The circuit includes equipment for detecting the open or closed condition of the subscriber loop, for supplying operate and release signals to the cross-point network, for controlling the supply of ringing current to the subscriber line, and an arrangement for transferring the subscriber line to a test trunk so that conventional line tests may be made from the central office.

For the operation, assume first that the subscriber at station S12 initiates a call by taking his handset off hook, thereby closing the line loop. In response thereto the loop detector 1001 places a ground potential on lead 263 to an inhibit input of the line gate 1102. The line gate also has ground potential at its other inhibit input on lead 264. Thus the line gate 1102 is not inhibited. If at least one trunk is available, a negative potential appears on lead B–0′ which is passed through the OR gate 1109 to the line 1102. A "1" output is thus produced at the output of the line gate, which is inverted by amplifier 1103, inverted again by amplifier 1104, and appears as a "1" at an input of AND gate 1110. The next scanning pulse in time slot 12 on lead LC12 is then passed by gate 1110 to set the crosspoint flip flop 1007. The pulse is also coupled through diode 240 to the common conductor LC and transmitted over the signalling circuits to the expander line circuit 12 at the central office. At the same time a "0" output from amplifier 1103 is supplied over lead 255, so that the output of AND gate 1106 remains "0," thereby preventing the crosspoint flip flop 1007 from being reset. In response to the setting of flip flop 1007 and to the transmission of signal pulses over lead LC to the central office, a connection is completed through the crosspoint networks in the concentrator and expander and in the main exchange equipment, and then dial tone is returned from the main exchange and transmitted to the subset at station S12.

The subscriber dials, thereby opening and closing his loop, causing the output of line gate 1102 and thereby the output of gate 1110 to vary between "0" and "1." Therefore a train of loop-closure pulses appears on lead LC in time slot 12, interrupted in accordance with the dial break period, which is transmitted to the central office line equipment and converted to direct-current pulses for operating the main exchange equipment. Throughout the dialing, release of the crosspoint connection is prevented by the release delay circuit 1105 which inhibits gate 1106 and prevents flip flop 1007 from being reset.

If at the time a call is initiated all trunks are busy, the signal on lead B–0′ is "0." Therefore the output from gate 1109 is "0" and the line gate 1102 output remains at "0." A tone gate 1018 is normally enabled by the signal on lead 252 from flip flop 1007, and therefore transmits busy tone from generator 217 through capacitor 237 and transformer 234 onto the subscriber line. Thus the subscriber upon taking his handset off hook immediately receives busy tone. In the line circuits which have seized a trunk and have a call in progress when all trunks are busy, a "0" signal from gate 1109 to the line gate 1102 would cause the connections to be released. To prevent this the output from gate 1106, which is "0" during a connection, is inverted by amplifier 1108 and supplied as a "1" through gate 1109 to maintain the connection.

Assume now that a call is received at the main exchange which is to terminate at line SL12. Signal pulses are then transmitted from the central office which are received at the concentrator line circuit on lead LS12′ during its time slot. These pulses on lead LS12′ overlap (begin before and end after) the scanning pulses on lead LC12. Therefore the ringing flip flop 1112 receives pulses at its set input, and the AND gate 1111 is inhibited from supplying pulses to the reset input. The flip flop 1112 is set and remains set as long as the signal pulses continue to arrive on lead LS12′.

The "1" signal on lead 253 from the ringing flip flop 1112 enables the ringing gate 1013 so that ringing current is transmitted from the ringing generator 216 through gate 1013 and transformer 232 onto the subscriber's line. The output of the interrupter gate 1014 is a "1" during the ringing period and a "0" during the silent period if the called subscriber has not answered (loop open). This permits sampling of the line condition during the silent period and prevents the ringing voltage from presenting erroneous information regarding the condition of the subscriber's loop.

If the call is abandoned, pulses will cease to appear on lead LS12' and the ringing flip flop 1112 will be reset, cutting off the ringing. In response to answering of the call, the line gate 1102 produces a "1" output indicating that the loop is closed, the crosspoint flip flop 1007 is set, and pulses are transmitted over lead LC to the central office. In response to the LC pulses, the central office ceases the transmission of LS pulses, and the ringing flip flop 1112 is reset by the LC pulses on lead LC12.

At the termination of either an originating or a terminating call, the opening of the loop causes the flip flop 1007 to be reset and the transmission of LC pulses to the central office to cease, thereby causing the connection to be released.

Referring to FIG. 10, the loop detector 1001 is used both to detect the condition of the loop, and also to isolate the direct-current supply from the subscriber's loop during the ringing cycle. The circuit is capable of sampling the condition of the loop between ringing periods to detect the closing of the loop, which indicates that the call has been answered. Also during an originating call it repeats the dialing signals without undue distortion.

The secondary of the ringing transformer 232 is connected directly across the subscriber's loop, presenting a 10,000-ohm audio shunt. One side of the line transformer 234 is also connected across the line in parallel with the ringing transformer. The 48-volt common battery is isolated from the ringing and audio signals by the choke 231 and the loop detector 1001. The choke 231 presents a high impedance to audio frequencies.

The transistors 1022 and 1023 are used as a switching device, ground being connected through the emitter-collector paths of these two transistors in series, a 220-ohm resistor 1026, diode 1025, and the lower winding of choke 231 to conductor 2LB of the subscriber line. The emitter-collector path of each of these two transistors is sunted by a 470,000-ohm resistor, and the collector of transistor 1022 is connected through a 10,000-ohm resistor to the −48 volt terminal. The transistor 1021 is used as the detecting device. Its collector is connected directly to −8 volts, its emitter is connected through a 39,000-ohm resistor to +16 volts, and its base is connected through a 12,000-ohm resistor to +16 volts, and also through diode 1024 and a 3900-ohm resistor to lead 261 to the lower winding of choke 231. Transistor 1021 has its emitter connected through respective 390-ohm resistors to the base electrodes of the transistors 1022 and 1023.

With the line loop open there is no direct-current path through the subset at station S12. In this state of the line, transistor 1021 is reverse biased, causing transistors 1022 and 1023 to be reverse biased. Therefore a high impedance exists between conductor 261 and ground. The potential on lead 263 is —45 volts, which is the "1" output. During ringing diodes 1024 and 1025 block the ringing signal to insure that it does not forward bias any of the transistors in the loop detector 1001. This eliminates erroneous information regarding the state of the subscriber's loop.

With the line loop closed, a direct current path from the +16 volts biasing supply, through the path which includes diode 1024, lead 261 and the subscriber's loop to the −48 volt source, causes transistor 1021 to become forward biased and to conduct. The transistors 1022 and 1023 are then forward biased and conduct to provide a low impedance path from ground to lead 261. The output on lead 263 is then at −6 volts, a "0" output.

Referring to FIG. 11, the line gate 1102, includes one AND input to diode 1122 and two inhibit inputs through respective resistors to the base electrode of a transistor 1121. The output lead is connected through a 3300-ohm resistor to −8 volts. The base electrode of transistor 1121 is connected through an 18,000-ohm bias resistor 1125 to ground. One inhibit input is through a 47,000-ohm resistor 1124 to lead 263 from the loop detector 1001. The other inhibit input is a connection from the base electrode through the 4700-ohm resistor 1123 and conductor 264 to the output of the interrupter gate 1014.

The release delay circuit 1105 is provided to prevent release of the crosspoint connections during dialing. The dial impulses comprise 40-millisecond make intervals (loop closed) and 60-millisecond break intervals (loop opened), nominal values.

In amplifier 1103 transistor 1130 is normally reverse biased while in amplifier 1104 transistor 1131 is normally forward biased. In response to a "1" output from the line gate 1102, transistor 1130 becomes forward biased and transistor 1131 reverse biased. Then in circuit 1105 the four-microfarad capacitor 1140 charges through a path comprising diode 1141, a 1000-ohm resistor, and a 39,000-ohm resistor to the −16 volt bias source. During dialing the capacitor 1140 charges during the make intervals and discharges during the break intervals. This charge maintains a potential sufficient to keep the transistor 1150 in gate 1106 forward biased. Thus the output from gate 1106 to lead 256 remains at ground potential and the crosspoint flip flop 1007 cannot be reset. The discharge path for capacitor 1140 comprises a 27,000-ohm resistor and the base-emitter junction of transistor 1150. The discharge time constant is such that transistor 1150 remains forward biased for about 80 milliseconds. If the subscriber loop remains open for a longer period the transistor 1150 becomes reverse biased and the train of pulses from lead CP2 are passed by the diode 1153 to the output of gate 1106 to reset the crosspoint flip flop 1007.

Note that upon a "1" output from gate 1102, the amplifier 1103 supplies ground potential through transistor 1130 and over lead 255 and a diode input of gate 1106, so that the output of gate 1106 is immediately a "0." At the same time the "1" output from amplifier 1104 is supplied to gate 1110 so that the train of pulses on lead LC12 are gated over conductor 270 to set the crosspoint flip flop 1007.

The crosspoint flip flop 1007 comprises a pair of NPN transistors 1030 and 1031. This flip flop is arranged to use the trailing edges of the negative input pulses to change the state of conduction of the transistors. For example with a negative input pulse applied from conductor 270 to the set input, the capacitor 1032 differentiates the trailing edge to produce a positive spike which brings transistor 1030 into conduction, and in response thereto the transistor 1031 is rendered non-conductive. In this state the output on lead 251 is −8 volts, and the output on lead 252 is a positive potential. The negative pulse produced as transistor 1030 switches into conduction is supplied over lead 251 and resistor 241 (FIG. 2) to the crosspoint network to operate the one of the crosspoints which has been marked by the trunk circuits.

In response ot a negative pulse on lead 256 to the reset input, the trailing edge is differentiated by capacitor 1033 to bring transistor 1031 into conduction, and in response thereto the transistor 1030 is rendered non-conductive. The positive potential on lead 251 is then supplied through resistor 243 (FIG. 2) to bias transistor 242 non-conducting and cause the crosspoint to be released.

The busy tone gate 1018 has its control input connected over lead 252 to the "0" output of flip flop 1007. Normally upon the initiation of a call flip flop 1007 becomes set, and the positive potential on lead 252 is applied to the resistor in gate 1018 to reverse bias the diode and thereby block the signal at the tone input. However if all trunks are busy flip flop 1007 is not set, and the −8 volt potential on lead 252 is applied through the resistor of gate 1018 to forward bias the diode and pass the tone, which is supplied through capacitor 237 and transformer 234 to the subscriber's line.

The ringing flip flop 1112 is a conventional type using a pair of PNP transistors 1160 and 1161. A negative input pulse from LS12′ at the set input renders the transistor 1161 conductive and the transistor 1160 non-conductive, so that the output at output "1" to lead 253 is a negative potential while the output "0" to lead 254 is at ground potential. A negative pulse from gate 1111 to the reset input renders transistor 1160 conductive and transistor 1161 non-conductive, thereby reversing the output signals. The steady train of scanning pulses on lead LC12 are applied through the reset gate 1111 to maintain the flip flop 1112 in the reset condition. To ring the subscriber's station S12 on a terminating call, pulses are received on lead LS12′, to set the flip flop 1112, and to simultaneously inhibit the reset gate 1111.

The ringing gate 1013 comprises a transistor switch 1050 and a push pull amplifier comprising transistors 1051 and 1052. The collector of transistor 1050 is connected to the −8 volt bias potential through a 3300-ohm resistor, and to the emitters of the transistors 1051 and 1052 through a 3.3-ohm resistor. With the ringing flip flop 1112 in the normal reset condition, the ground potential on lead 253 maintains the transistor 1050 cut off, and the −8 volt potential at the collector of transistor 1050 reverse biases the transistors 1051 and 1052. With the ringing flip flop 1112 in the set condition, the −8 volts on lead 253 forward biases transistor 1050, thereby bringing the emitters of transistors 1051 and 1052 to near ground potential, so that the input signal from the ringing generator is amplified and supplied through transformer 232 to the subscriber line.

The line test circuit 219 (FIG. 2) is used to make routine tests of the subscriber line SL12, under control of equipment at the central office. A train of pulses on lead LT12′ control circuit 219, which maintains the relay 220 continuously operated as long as the pulses are received. Relay 220 at its contacts disconnects the subscriber line from the remainder of the line circuit and connects it to a test trunk. This test trunk may be derived from one or more of the twelve trunks used for talking and control, or it may be an additional trunk.

*Expander line circuit*

Figure 6:
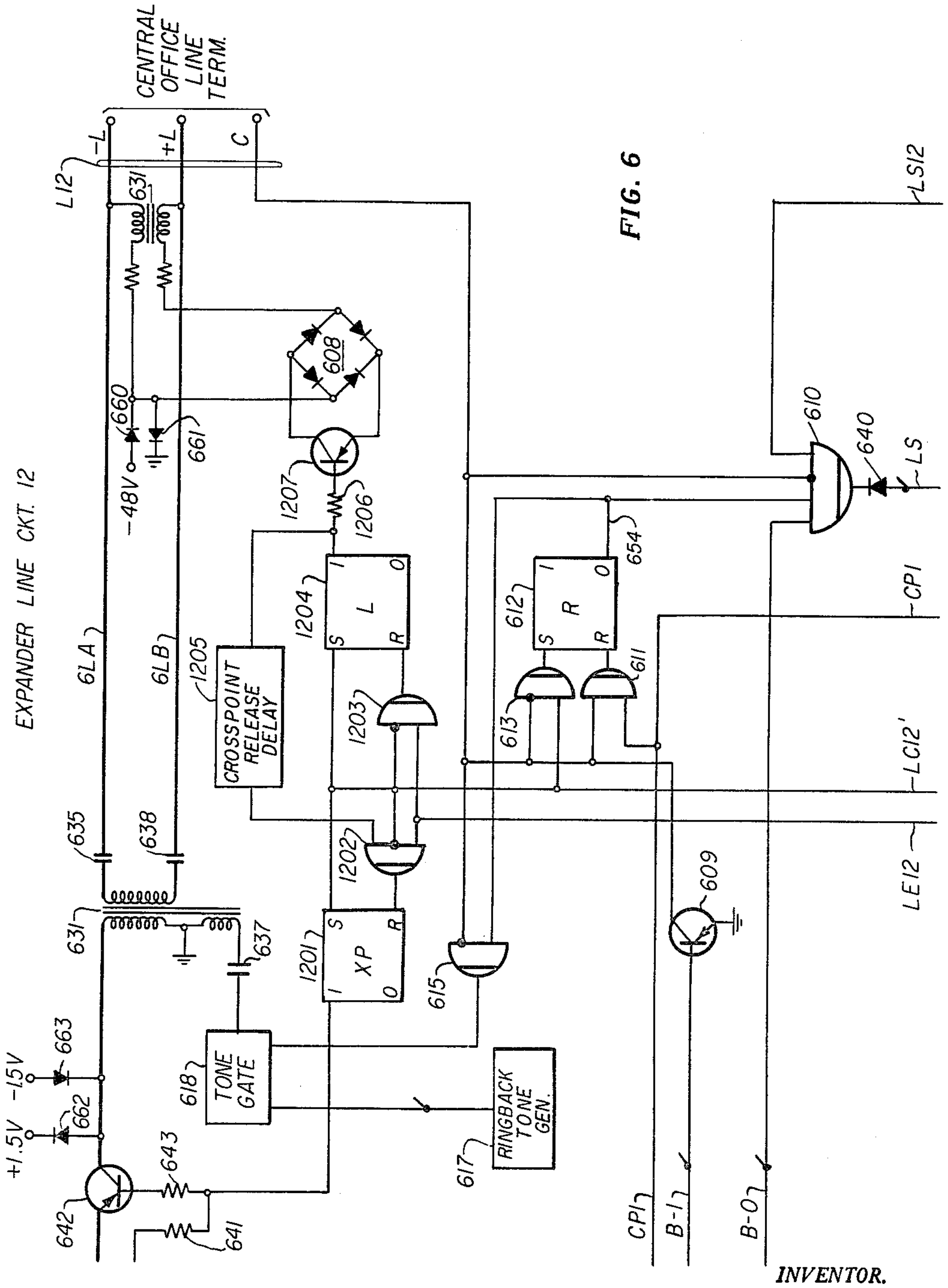
Figure 12:
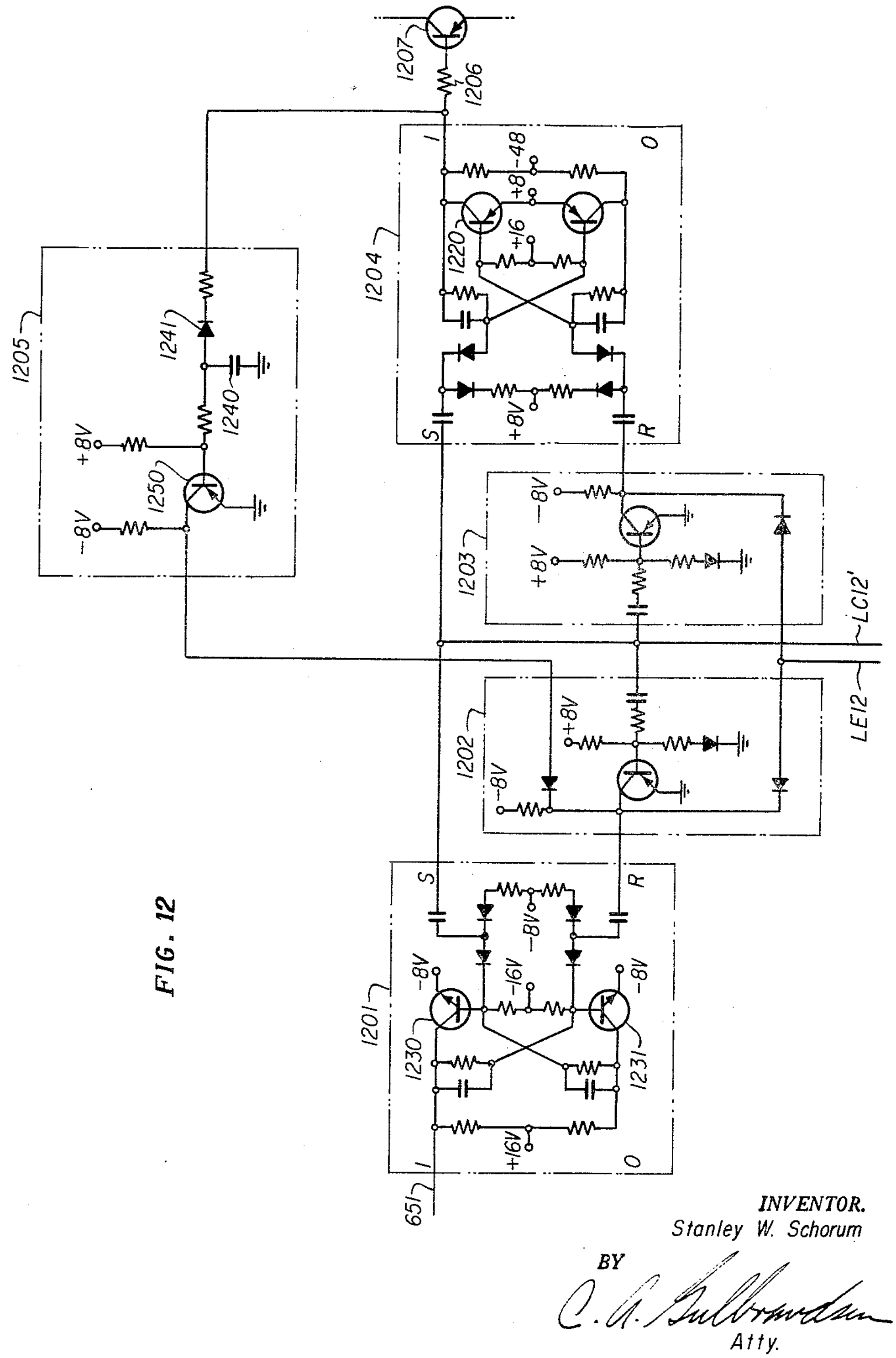

FIG. 6 is a functional block diagram of the expander line circuit which is connected by line L12 to a central office line terminal. Part of the circuit is shown in FIG. 12 in a schematic diagram. On a terminating call this circuit responds to ground on lead C upon seizure by the central office of the terminal to line L12 to transmit line-seizure pulses over lead LS, which causes ringing current to be sent to the subscriber line from the concentrator line circuit. In response to the receipt of a train of pulses on lead LC12′, indicating loop closure at the subscriber line, this circuit controls a direct-current switching path to the −L and +L conductors of line L12, it causes the establishment of a crosspoint connection to one of the ten trunks, and on a terminating call, it causes blocking of the pulses to lead LS thereby terminating the ringing of the called station.

For the operation, first assume that a terminating call is received which is directed to subscriber line SL12. The conventional main exchange equipment supplies ringing current to the −L and +L conductors of line L12 and ground to the C conductor. As soon as the ringing voltage exceeds the reverse bias potential of either diode 660 or 661, that diode conducts heavily and operates the ring cut off relay in the central office, thereby removing the ringing machine from the line. It should be noted that this does not give reverse battery supervision by the central office equipment, because the direct-current loop is not closed. Removing the ringing voltage from the line in this way protects the transistor 1207 from the high voltage.

At gate 610, the signal on conductor 654 is normally at "1," and if at least one trunk is available the signal on lead B–0 is also a "1." Therefore the ground signal on lead C to the inhibit input causes the gate 610 to be enabled to pass the train of pulses in time slot 12 on lead LS12 through the diode 640 to the common conductor LS. These pulses are transmitted by the signalling equipment to the concentrator line circuit of line SL12 to cause the ringing of the called station. The gate 615 supplies a "1" signal to tone gate 618, which is thereby enabled to pass ringback tone from generator 617 through capacitor 637 and transformer 631 to the line L12 to the central office.

When the called subscriber answers the call and thereby closes his loop, a train of pulses is transmitted over the signalling circuit and received at the expander line circuit on lead LC12′. This signal is applied through gate 613 to the set input of flip flop 612, and directly to the set inputs of flip flops 1201 and 1204. The "0" output on lead 654 from flip flop 612 blocks gates 610 and 615, thereby blocking the transmission of pulses to lead LS, and also terminating the transmission of ringback tone to the main exchange equipment. Flip flop 1201 supplies a signal from its "1" output through resistor 641 to cause the seizure of a crosspoint. Flip flop 1204 supplies a "1" signal through 1206 to the base electrode of transistor 1207, which conducts and thereby closes the direct-current loop between the −L and +L conductors of line L12.

Assume now that a call has been initiated at the subscriber station S12. In response thereto a train of pulses is received on lead LC12′. The pulses do not affect the flip flop 612, but they do set the crosspoint flip flop 1201 and the line switching flip flop 1204. This causes a crosspoint to be seized, and the direct-current loop to the main exchange equipment to be closed at transistor 1207. The main exchange responds and applies ground potential to lead C. The next pulse on lead LC12′ then sets flip flop 612, and the "0" signal on lead 654 blocks gates 610 and 615.

Dial tone received from the main exchange equipment is transmitted over the established talking connection from the expander line circuit to the concentrator line circuit and thence over the subscriber line to the calling station. As the subscriber dials, the train of pulses on lead LC12′ are turned on and off. During dialing the crosspoint release delay circuit 1205 prevents the resetting of the crosspoint flip flop 1201, so that the crosspoint connection is not released. The line switching flip flop 1204 is set and reset in accordance with the pulses on lead LC12′, thus turning on the transistor 1207, and opening and closing the direct-current loop to the main exchange equipment in accordance with the dial pulses. The call is then completed by the main exchange equipment in the usual manner.

Upon disconnect after either an originating or a terminating call, the pulses on lead LC12′ will be cut off in response to opening of the loop at the subscriber station S12, and the lead C is returned to negative potential by the main exchange equipment in the usual manner, which is normally in response to calling party release. In response to the absence of pulses on lead LC12′, the pulses on lead LE12 are transmitted through gates 1202 and 1203 to reset the flip flops 1201 and 1204 respectively. This releases the crosspoint connection, and opens the direct-current loop to the main exchange. In response to the negative potential on lead C, the gate 611 passes pulses from lead CP1 to reset flip flop 612.

The direct current switching circuit comprises a connection from the −L and +L conductors of line L12 through respective coils of choke 631 and respective resistors to one diagonal of a diode bridge 608. The other diagonal of the bridge is connected to the collector and emitter electrodes of transistor 1207. This bridge arrangement insures the correct polarity of the connections to transistor 1207 regardless of the direct current polarity applied to the −L and +L conductors in the main exchange equipment. The transistor 1207 is driven through resistor 1206 by the flip flop 1204, which is shown in detail in FIG. 12.

The "1" output of flip flop 1204 is also connected to the input of the release delay circuit 1205, which includes a two-microfarad capacitor 1240. The transistor 1250 normally has its base electrode biased to +8 volts and is therefore cut off. The output at its collector is therefore −8 volts supplied through the bias resistor. In response to the switching of flip flop 1204 to its set condition, transistor 1220 becomes cut off, and the potential at its "1" output terminal drops to approximately −25 volts. The capacitor 1240 then charges through the circuit including diode 1241 and a resistor in series. Near the end of the charging time transistor 1250 is biased to conduction. When flip flop 1204 switches to its reset condition, diode 1241 is reverse biased to prevent the discharge of capacitor 1240 through that path. Initially the capacitor discharges through the path including the emitter-base junction of transistor 1250, and also through a resistor to the +8 volt bias source. The time required for the potential at the base of transistor 1250 to reach a value which reverse biases that transistor is the delay time of the circuit. This should be greater than 60 milliseconds.

The crosspoint switching flip flop 1201 is similar to the corresponding flip flop 1007 in the concentrator line circuit; with an input circuit arrangement such that switching occurs on the trailing edge of the negative input pulses.

In the event that all trunks are busy, a "1" signal appears on lead B–1 which biases transistor 609 (FIG. 6) into conduction and thereby places ground on lead C. This effectively marks the line busy for terminating calls at the main exchange equipment. The "0" signal on lead B–0 blocks the gate 610, to prevent pulses being applied to lead LS.

The flip flop and gate circuits shown in the functional block form in FIG. 6, but not shown in the schematic of FIG. 12, are similar to other circuits shown in FIGS. 10, 11 and 12.

*Trunk circuits*

Figure 5:
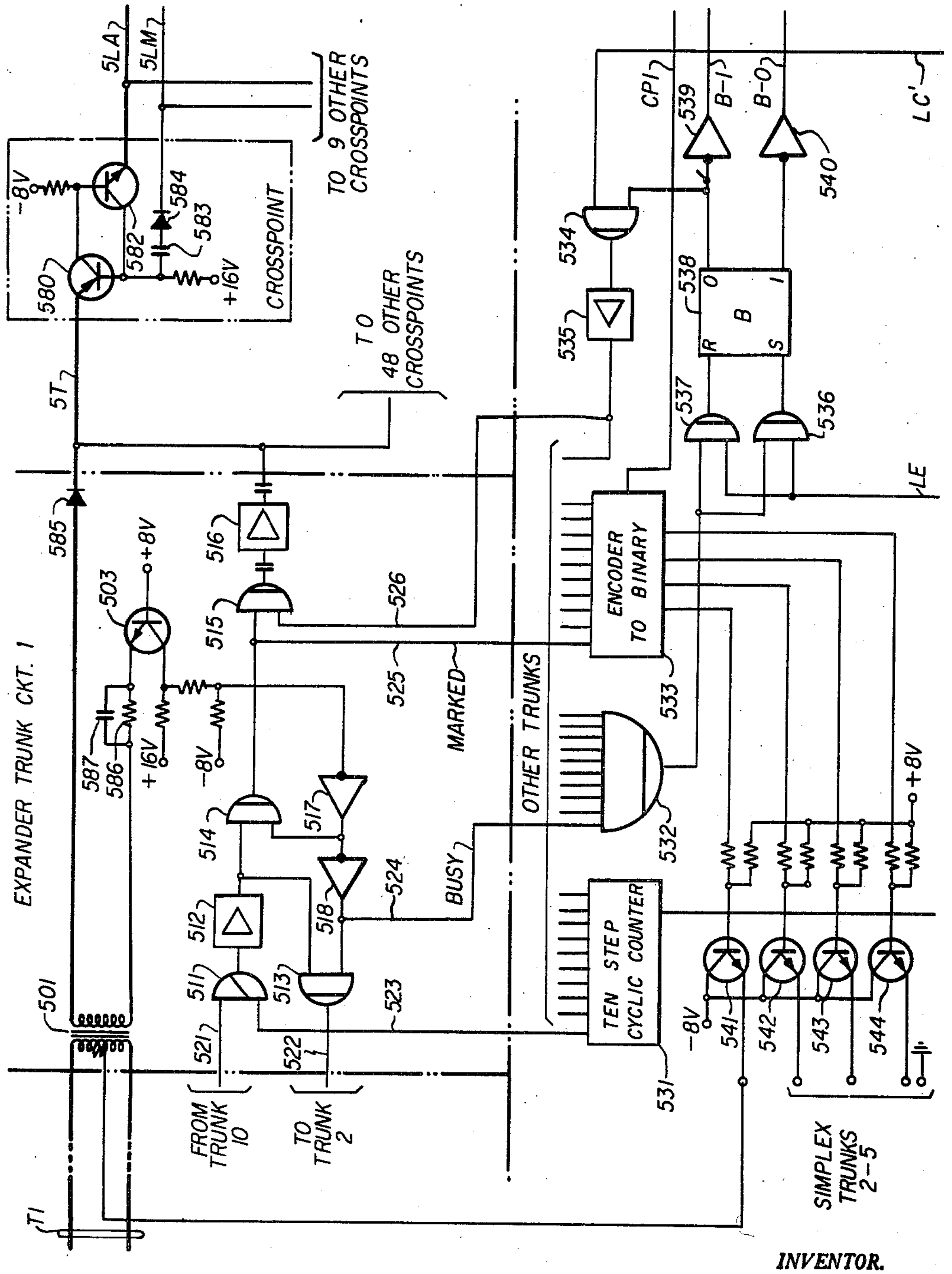

Referring to FIG. 5, the expander trunk circuit number 1 has trunk T1 coupled through a transformer 501 and a diode 585 to the conductor 5T from the crosspoint network. A transistor 503 is used to sense current flow on lead 5T from the crosspoint network, which indicates that the trunk is busy. The trunk control circuits include units 511–518 individual to the trunk, and units 531–544 common to all ten trunks.

A ten step cyclic counter 531 is driven by the synchronization pulse on lead SP1 to supply a trunk enabling signal to its ten output leads one at a time. Each step has a duration of five milliseconds during which the enabling signal is supplied to the corresponding trunk circuit, whether it is busy or not. In trunk circuit number 1 this enabling signal is supplied over lead 523 through OR gate 511 to amplifier 512. This amplifier is a type having the output of the same polarity as the input, with direct coupling, for example two grounded-emitter stages in tandem. The output is applied to two AND gates 513 and 514.

A trunk busy indicator comprises transistor 503 and inverter amplifiers 517 and 518. The state of the trunk is determined by the state of its crosspoints. If holding current is being supplied to the crosspoint the trunk is busy. Transistor 503 provides the holding current, and thus the state of its collector can be used as the desired busy indication. A voltage divider is connected to +16 volts at one end and −8 volts at the other end, with the collector of transistor 503 connected to one tap of the divider and an output lead connected to another tap. With transistor 503 conducting, indicating that the trunk is busy, a "1" signal is supplied at the input of amplifier 517. This signal is inverted by amplifier 517 and again inverted by amplifier 518 to its original condition. The output from amplifier 517 is connected as an input to gate 514. The output from amplifier 518 is connected as an input to gate 513, and over conductor 524 to one of the inputs of AND gate 532.

Thus if the trunk is busy gate 514 is blocked, gate 513 is enabled, and a busy signal is supplied to gate 532. If an input signal either from counter 531 or from lead 521 is supplied through gate 511 and amplifier 512, it is forwarded through gate 513 to lead 522, and thence to an input of trunk number two corresponding to lead 521 to an OR gate corresponding to gate 511. The ten trunks are connected in a chain arrangement with the lead 522 of each trunk connected to the input lead 521 of the succeeding trunk. Thus gate 511 is a chain-in gate, and gate 513 is a chain-out gate. The enabling signal from the counter 531 is passed along from trunk to trunk until it reaches an idle trunk.

If the trunk is idle and an enabling signal is received either from the counter 531 or at lead 521 it is transmitted through gates 511, amplifier 512, and gate 514 to an input of gate 515 and also to an input of the encoder 533. To mark the crosspoint a pulse received on lead LC′ is transmitted through gate 534, amplifier 535, gate 515, and amplifier 516 to the lead 5T which is connected to forty nine crosspoints, one of which is shown. The amplifier 516 may be a single grounded-emitter stage with an output pulse transformer to supply a positive pulse to lead 5T.

The counter 531 may be any type of ten-step cyclic counting arrangement which is advanced one step by each pulse on lead SP1. One possible arrangement is four flip flops interconnected by diode gates to give the desired counting, with a diode gate matrix to convert the binary count to one out of ten.

The all-trunks-busy indicator portion of the common trunk circuits includes an AND gate 532 and a flip flop 538. Gate 532 has one input from each trunk, and when all trunks are busy it supplies a "1" signal to enable gate 536 and to inhibit gate 537. The next pulse on lead LE is then applied through gate 536 to set the flip flop 538. The "0" output from the flip flop is applied through an amplifier 539 to the B–1 lead to the transistor 609 in the line circuit to ground the C lead and thus make the line busy in the main exchange. The amplifier 539 and the other corresponding amplifiers may be each a single NPN transistor with its emitter connected through a 120-ohm resistor to −8 volts, and its collector connected directly to the base electrode of the transistor 609 and through an 820-ohm bias resistor to +8 volts. The base electrodes are connected to the "0" output of the flip flop, being brought into conduction by the ground potential when the flip flop is in the set condition to supply −8 volts at their respective outputs.

The "1" output from flip flop 538 is supplied through a single grounded emitter inverting amplifier 530 to the lead B–0 connected in multiple to the gates 610 of all of the line circuits.

The "0" output from flip flop 538 is also connected to an input of gate 534. When the flip flop 538 is in the reset condition, gate 534 passes the pulses on lead LC′ to a marking generator 535, which comprises a blocking oscillator and amplifier. On the trailing edge of the pulse supplied over lead LC′, circuit 535 generates a negative 8-volt pulse having a duration of 10 microseconds, which is supplied in multiple to the gates 515 of all ten trunk circuits. In the one trunk which has been selected, the gate 515 passes the marking pulse to amplifier 516.

The encoder 533 may comprise four flip flops with input gates selectively connected to the ten trunks, and actuated by the pulses on lead CP1 to change the states of the flip-flops when the identity of the selected trunk changes. Thus as long as the same trunk remains marked there is a coded signal on the four output leads to identify the one trunk which is marked.

Figure 3:
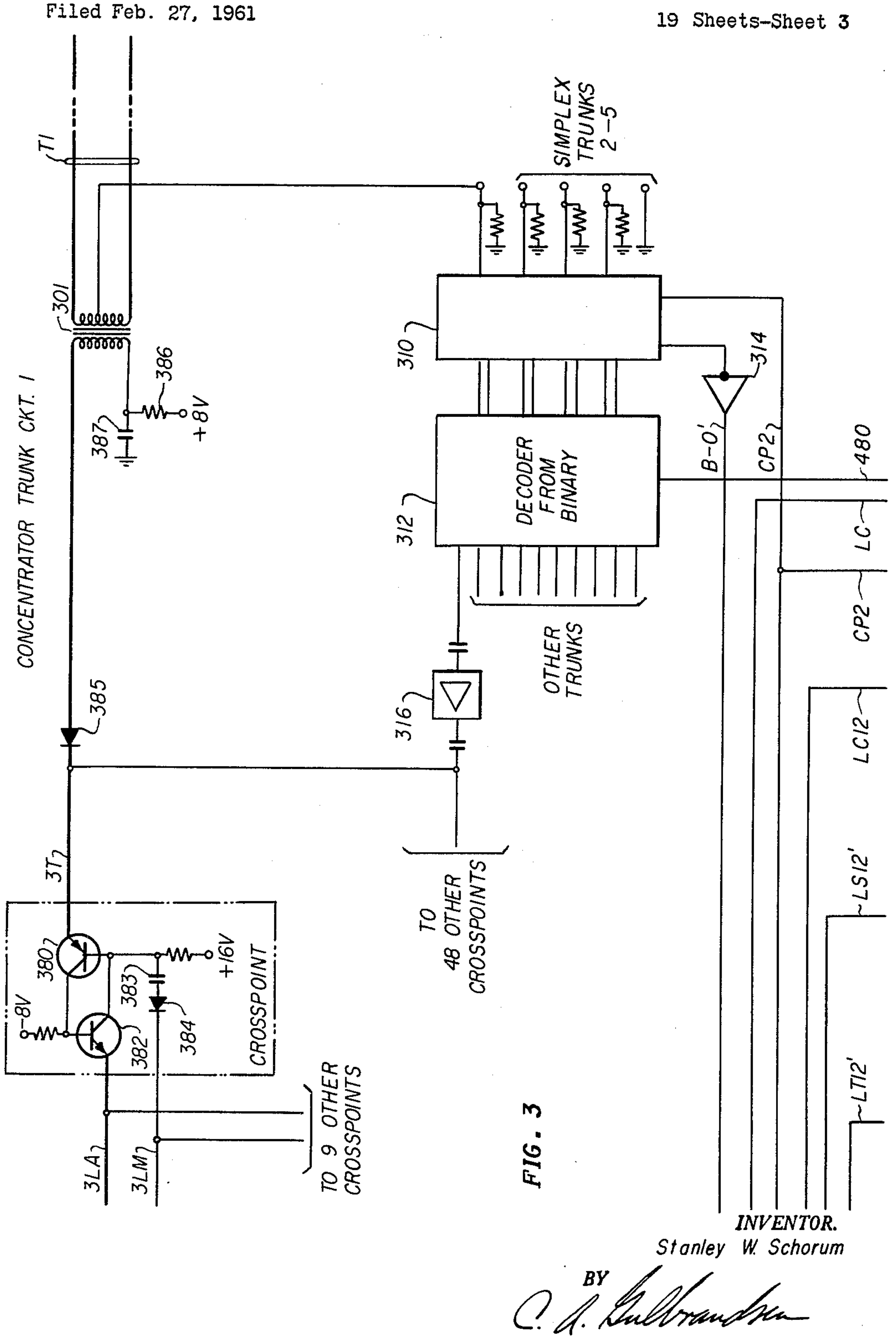

The four output leads from encoder 533 are respectively connected through resistors to the base electrodes of transistors 541–544. The emitter electrode of transistor 541 is connected to the phantom of trunk T1 as shown, and the emitter electrodes of transistors 542, 543, and 544 are in like manner respectively connected to the simplex circuits of trunks 2–4 (not shown). A return path is provided by a ground connection to the simplex circuit of trunk 5 (not shown). As shown in FIG. 3, the simplex circuits of trunks 1–4 are connected at the remote location through respective resistors to ground, to thereby provide four emitter follower amplifier circuits. The resistors at the concentrator may be variable to compensate for the resistance of the trunks.

In the receiving unit 310 at the concentrator the respective emitter-follower output signals received on the simplex trunks 1–4 are gated with the clock pulses on lead CP2 to four flip flops (not shown) respectively. The outputs from these flip flops are supplied to a decoder circuit 312, which comprises a matrix of diode gates (not shown) to supply a marking signal to one of the ten output leads corresponding to the marked trunk. Each of the outputs from the decoder 312 is also gated with the marking pulse on lead 480. If all trunks are busy, all of the flip flops in unit 310 will be in the reset condition, no marking signal will be obtained at the outputs of unit 312, and a four-input diode gate (not shown) transmits a signal to an inverter amplifier 314. This amplifier supplies an output signal on lead B–0′ in the concentrator line circuits.

Each of the concentrator trunk circuits includes an individual mark amplifier 316, which is similar to the mark amplifier 516 in the expander trunk circuits. For the one trunk which is marked, the amplifier 316 receives an input signal from the decoder 312 and supplies a mark potential to the lead 3T to mark the forty-nine crosspoints.

*Crosspoint network*

There are two crosspoint networks used in this system, one in the concentrator and the other in the expander. Each of these networks comprises 490 crosspoints connected in a single stage coordinate switching array, to selectively connect any one of the forty-nine line circuits to any one of the the trunk circuits. One of the concentrator crosspoints is shown in FIG. 3, and one of the expander crosspoints is shown in FIG. 5.

Referring to FIG. 3, the crosspoint comprises a PNP transistor 380 such as type 2N650, and an NPN transistor 382, such as type 2N585, in a hook connected arrangement with the base electrode of each connected to the collector electrode of the other. The base electrode of transistor 380 is connected through a bias resistor to +16 volts, and the base electrode of transistor 382 is connected through a bias resistor to −8 volts. In series between the line transformer 234 of each line and the connection to the crosspoints is a PNP transistor 242 (FIG. 2) which is used for releasing a seized crosspoint. On the trunk side the connection from the forty nine crosspoints is connected through a diode 385 in series with a winding of transformer 301 and thence to the parallel combination of a resistor 368 to +8 volts and a capacitor 387 to ground. The other winding of transformer 301 is the connection to the trunk T1. Resistor 386 is used to determine the crosspoint sustaining current while the capacitor 387 functions as an audio bypass.

The crosspoint is switched to the conducting state by the simultaneous application of a negative trigger (make pulse) to the base, and a positive pulse (mark pulse) to the emitter of the PNP transistor 380. These pulses forward bias the emitter-base junction of the PNP transistor causing it to conduct, which in turn causes the NPN transistor to conduct. The sustaining current flow causes the potential at the electrodes of the transistors to remain in the forward bias condition.

The make pulse is the differentiated negative step output of the crosspoint switching flip flop 1007. This pulse is applied through resistor 241, diode 384, and capacitor 383 in series. Diode 384 is used to isolate the crosspoint from the positive going step output of the flip flop 1007. Capacitor 383 provides direct current isolation between the crosspoint and the flip flop, and also functions as the differentiating capacitor to form the make pulse from the flip flop step output.

The mark pulse is a positive pulse produced by the unit 316 in response to the trunk marking output pulse from the decoder 312.

The crosspoint is switched to the non-conducting condition by opening the path of the sustaining current. This is accomplished by applying a positive potential to the base of the release transistor 242, obtained from the crosspoint switching flip flop 1007 and applied through resistor 243.

Two diodes 244 and 245 are used in each line circuit as clamps to −1.5 volts and +1.5 volts respectively. This prevents the occurrence of high voltages spurious signals which could cause release of the crosspoint. One diode 385 is used in the trunk led to isolate the positive mark pulse from the transformer inductance.

The crosspoint arrangement in the expander is substantially the same as that in the concentrator.

*Clock*

Figure 8:
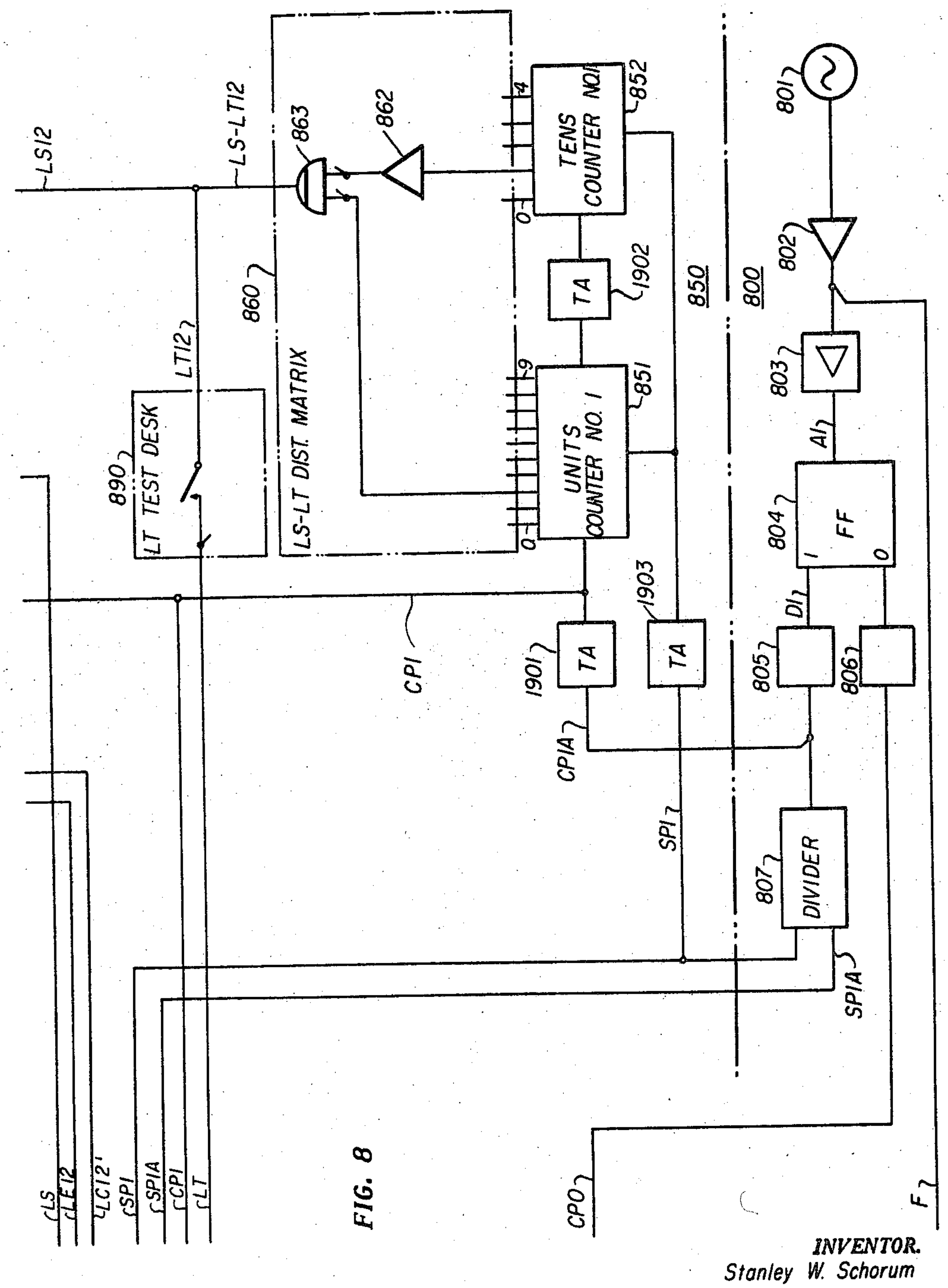

The basic control pulse generator arrangement or clock 800, which supplies the master control pulses for the entire system, is shown in functional block diagram at the bottom of FIG. 8. FIG. 22 is a series of graphs showing the time relation of the principal control signals of the entire system. All of the graphs are for convenience shown with the same amplitude, and are not intended to indicate the actual amplitudes as they occur in the system.

All of the control signals of the system are derived from the output of a twenty-kilocycle-per-second sine wave oscillator 801, through a grounded emitter linear buffer amplifier 802 to conductor F. This signal is represented by graph F in FIG. 22.

The signal from lead F is supplied through an overdriven amplifier 803, which may comprise two grounded-emitter stages in tandem, to supply a square wave of the same twenty-kilocycle frequency to lead A1, as shown by graph A1. The flip flop 804 is symetrically driven by the signal from lead A1 to provide two ten-kilocycle-per-second square wave signals at is respective outputs. The signal to lead D1, from the "1" output of the flip flop, is shown by graph D1. Each of the units 805 and 806 is a blocking oscillator and amplifier for generating a ten microsecond pulse in response to its input signal. The output pulses from these two units have a repetition rate of 100 microseconds, and are displaced from each other by 50 microseconds. The output from unit 805 to lead CP1A is repeated by the trigger amplifier 1901 as a ten-microsecond pulse on lead CP1. The pulses on leads CP1 and CP0 are shown by the corresponding graphs.

The divider 807 is a fifty step counter for generating the basic synchronization pulses which mark the end of each frame. It may for example comprise six flip flops (not shown) with associated diode gates arranged to count in a binary manner up to fifty and then to reset. The output is gated from the pulse on lead CP0 to provide a ten-microsecond output pulse for every fiftieth input pulse. Two outputs are provided which are both of ten microsecond duration and are coincident. A positive 2-volt pulse on lead SP1A is supplied to the transmitter circuit 2003 for transmission to the remote unit, and a negative 8-volt pulse on lead SP1, as shown in the graph, is supplied to the trigger amplifier 1903, and to the trunk circuits in FIG. 5.

*Distributors*

In the distributor 850 the units counter 851 is a ten-stage ring counter, and the tens counter 852 is a five-stage ring counter. In each of the counters each stage may comprise a bistable trigger circuit such as flip flop. The output pulses from the trigger amplifier 1901 drives the units counter 851 to one step every 100 microseconds. In switching from stage 9 to stage 0, the counter 851 supplies a pulse to trigger amplifier 1902 which drives the tens counter 852 one step. The synchronization pulse SP1 through trigger amplifier 1903 is used to supply a pulse to all stages of each of the counters 851 and 852 to insure that at the end of each frame the units counter 851 is at stage 9 and the tens counter 852 is at stage 4. Thus the first clock pulse CP1 at the output of trigger amplifier 1901 will drive the units counter to stage 0 and thereby drive the tens counter 852 also to stage 0.

Figure 19:
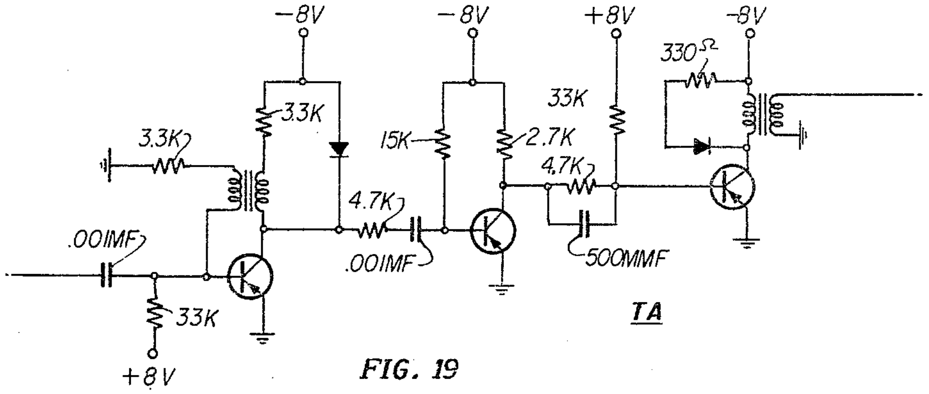

The number two distributor 450 includes a units counter 451 and a tens counter 452 with associated trigger amplifiers, and the number three distributor 750 includes a units counter 751 and tens counter 752 with associated trigger amplifiers, the counting arrangements being essentially the same as in the number one distributor 850. Each of the trigger amplifiers 1901–1909 may comprise a first transistor in a blocking oscillator circuit followed by two grounded-emitter amplifier stages, as shown in FIG. 19.

In distributor 850 the LS/LT distributor matrix 860 comprises forty nine AND gates with respective output connections to the forty nine line circuits, of which only gate 863 is shown. The output lead LS–LT12 has one branch LS12 extending to the expander line circuit number of line L12, and a branch LT12 extending to the test desk 890. Each output lead from units counter 851 is connected in multiple to the five gates having that units digit, and each output from the tens counter 852 is connected through an amplifier to the ten gates having that tens digit. Only the amplifier 862 from tens output 1 is shown. The output from this amplifier is connected to gate 863 and nine other gates having tens digit 1. Thus each of the fifty lines is supplied with a 100-microsecond enabling pulse during its respective time slot.

In distributor 450, the received pulses on lead LS′ are routed through matrix 460 to the respective line circuits corresponding to the time slots in which the pulses appear. For example if the pulse occurs in time slot 12 it is gated with the output 1 from the tens counter 452 through gate 461, through an emitter-follower amplifier 462, and through gate 463, gated with output 2 from units counter 451 to the lead LS12′ extending to the concentrator line circuit number 12. The entire matrix comprises forty nine gates such as 463, five gates such as 461, and five emitter follower amplifiers such as amplifier 462.

The LT matrix 453 may be similar to matrix 460, with the pulses on lead LT′ connected as one of the inputs through each of the tens gates.

The LC distributor matrix 470 is also similar to matrix 460, except that the inputs to the tens gates are from lead CP2, on which a ten-microsecond pulse appears during every time slot. There are five tens gates such as gate 471 with their outputs connected to respective emitter-follower amplifiers such as amplifier 472, and forty nine gates such as gate 473 with outputs to the respective line circuits. This matrix supplies a ten-microsecond scanning pulse to each of the line circuits in succession.

In the distributor 750, the LC routing matrix 770 is similar to matrix 460, having five ten gates 771 with respective emitter-follower amplifiers such as amplifier 772, and forty nine gates such as 773 for routing the LC pulses to the respective line circuits.

The central office supervisory matrix 760 supplies a seven-microsecond supervisory pulse to all of the line circuits in turn: It comprises five tens gates such as gate 761, and forty nine gates such as gate 763 to the individual line circuits. It routes the pulses on lead LE from generator 1702, which occur in every time slot, to the line circuits.

*Pulse transmission and reshaping circuits*

The pulse transmission and reshaping circuits comprise a remote unit 400 and a central office unit 700. These circuits are used for the transmission of pulses over the control trunks CT1 and CT2, for providing the proper time relation of the various pulses, and supplying the properly shaped pulses to the other portions of the system.

As explained in the section titled Distributors, each time division multiplex frame for the control signal pulses has a duration of five milliseconds divided into fifty time slots of 100 microseconds each. To maintain synchronism all three distributors must operate at exactly the same pulse repetition rate, and the time slots must be kept in correspondence for all three distributors. The agreement in repetition rate is obtained by deriving the driving pulses for all of the distributors from the same basic sine wave signal on lead F. The time slots are maintained in correspondence by synchronization pulses derived from the divider circuit 807 once per frame and supplied to all three distributors to reset them at the end of every frame. The information pulses which are transmitted over the control trunks CT1 and CT2 undergo a propagation delay. The amount of delay varies according to the length and type of the physical control trunks used and typically may be ten to twenty microseconds per mile for the frequencies used here. The time slots of the distributors 450 and 750 must also be delayed to correspond to the delay of the transmitted pulses.

The synchronization pulses are transmitted from the central unit over control trunk CT1 to the remote unit, and then back over control trunk CT2 to the central office unit. Since these synchronization pulses undergo the same propagation delay as the information pulses, they will be available at the number two and number three distributors at the correct time relationship. Since the last time slot of each frame is used for transmission of the synchronization pulses, only forty nine time slots are available for use by the lines.

To furnish the three different time bases for the three distributors, with the same pulse repetition rate, the signal on lead F is supplied through amplifier 803 to directly provide the time base for the number one distributor, is connected as an input to the phase shift unit 1600 to supply the time base for the number three distributor, and is supplied to transformer 702 and transmitted over the phantom of the two control trunks to the transformer 402, and thence over lead F′ as an input to the phase shift circuit 1400 to provide the time base for the number two distributor.

Figure 14:
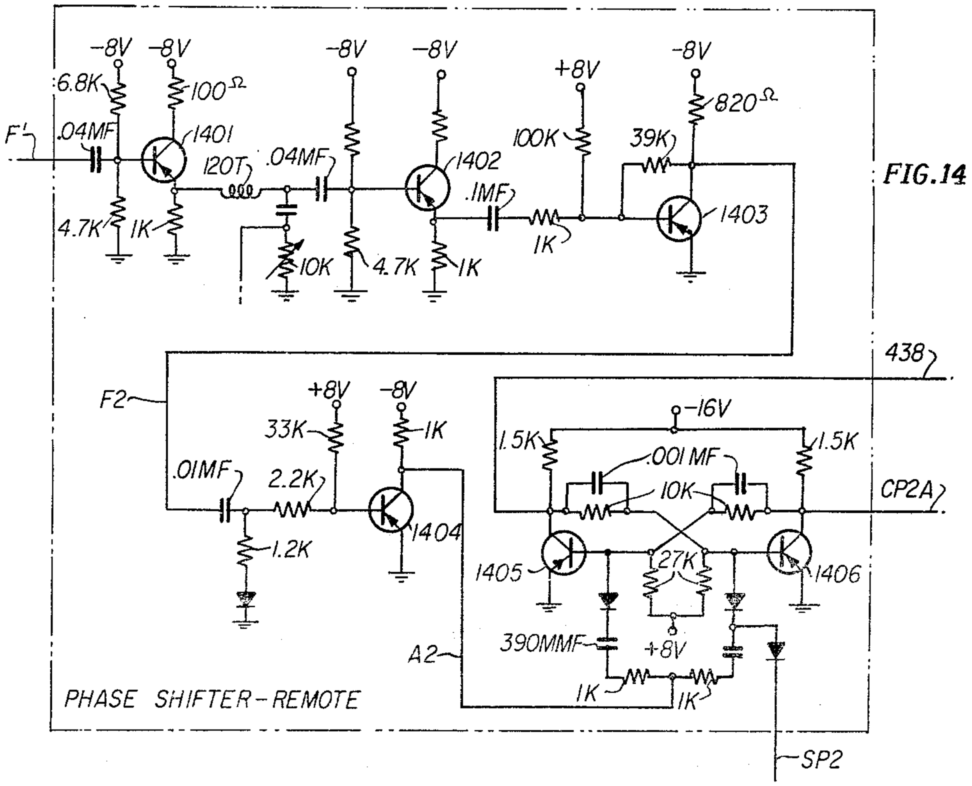

In the remote unit the phase shift device 1400 is shown in schematic diagram in FIG. 14. The 20-kilocycle-per-second sine wave received on lead F′ is first amplified by an emitter follower comprising transistor 1401. The signal is then supplied to a phase shifting circuit which introduces as much delay in the sine wave as the trunk CT1 introduces to the information and synchronization pulses. The phase shifter is variable to compensate for various lengths of the physical control trunk. By adjusting the phase shifting network so that the pulse on lead SP2 is exactly fifty microseconds after a pulse on lead CP2 the propagation delay is automatically compensated. A high impedance input to transistor 1402 prevents the phase shifter from being loaded excessively. A linear class A amplifier comprising transistor 1403 amplifies the voltage to a level than can satisfactorily drive an overdriven amplifier comprising transistor 1404. The signal on lead F2 from the collector of transistor 1403 is shown by graph F2 in FIG. 22. This graph shows the time delay TD1 from the signal F and the time base for the pulses used by the number one distributor. The collector output from transistor 1404 is the trigger input to a timing flip flop comprising transistors 1405 and 1406. This flip flop is reset by the signal on lead SP2 once per frame. The collector output of transistor 1406 to lead CP2A, which is at "1" during the first half and at "0" during the second half of each time slot, is the input trigger to the number two distributor as well as one input to the gate 404 for the received LS pulses. The collector output of transistor 1405 which is at "0" during the first half and at "1" during the second half of each time slot is one input to the gate 405 for received LT pulses. In FIG. 22 the graph A2 shows the output from the collector of transistor 1404, and graph CP2A shows the output from the collector of transistor 1406.

Figure 16:
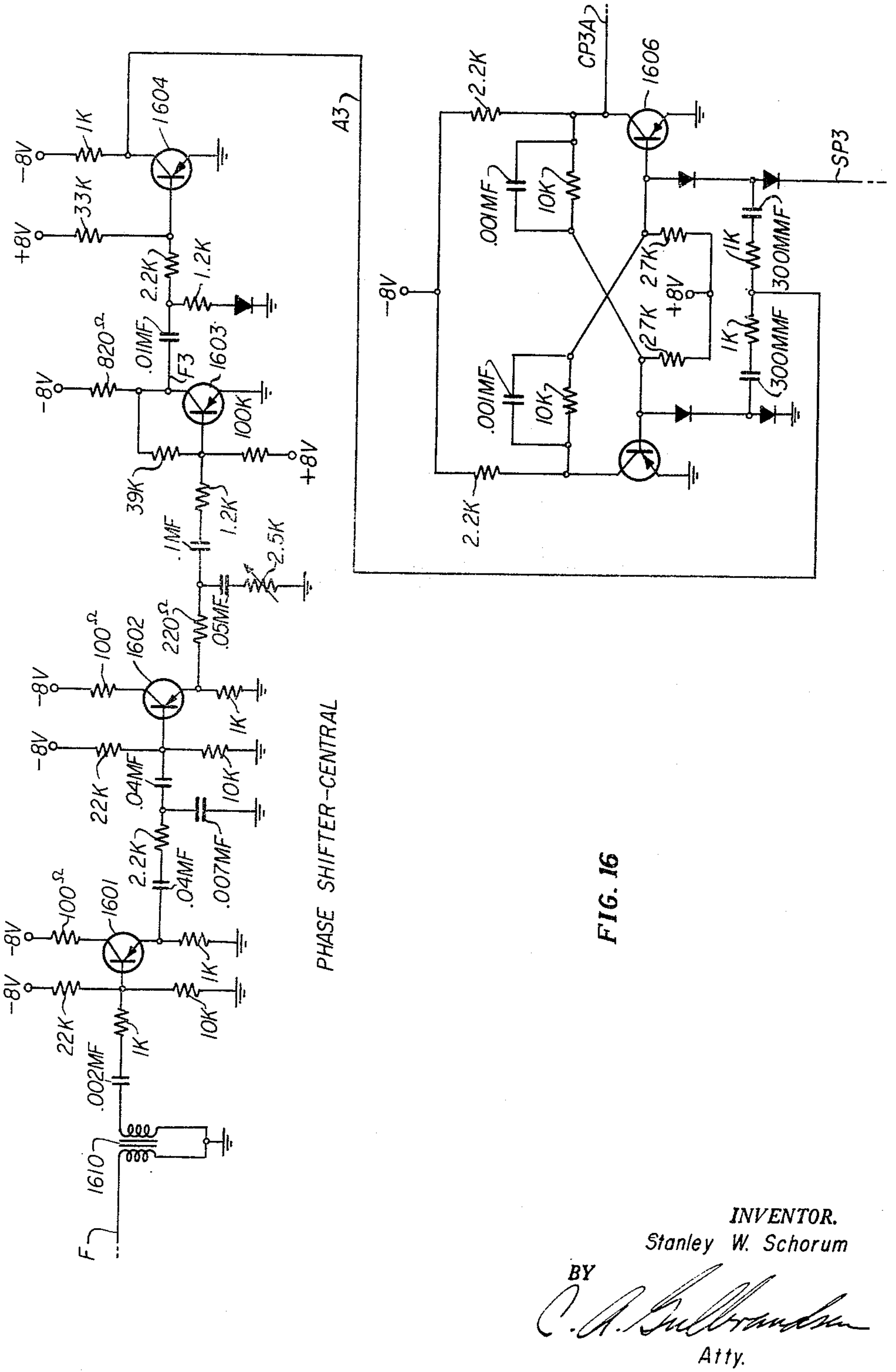

The central office phase shifting unit 1600 is shown in a schematic diagram in FIG. 16. The sine wave signal on lead F is coupled through transformer 1610 to an emitter follower amplifier comprising transistor 1601. The output from this amplifier is the input signal to a fixed phase shifting network. The emitter follower amplifier comprising transistor 1602 presents a high impedance to the fixed phase shifting network and insures stability. The output from transistor 1602 is the input signal to another phase shifter which is variable to compensate for the propagation delay of pulses on the control trunks. By adjusting the phase shifter so that the pulse on lead SP3 is exactly fifty microseconds after a pulse on lead CP3 the propagation delay is automatically compensated. A linear class A amplifier comprising transistor 1603 amplifies the voltage to a level on lead F3 that can satisfactorily drive the overdriven amplifier comprising transistor 1604. The collector output of transistor 1604 through lead A3 is the trigger input to the flip flop comprising transistors 1605 and 1606. The output from the collector of transistor 1606 is the signal on lead CP3A for driving the number three distributor. In FIG. 22 the graphs F3, A3, and CP3A show the signals at the corresponding leads of the circuit in FIG. 16. This shows that the time delay TD2 of the time base for signal F3 with respect to the time base of the number 2 distributor, that is the total of TD1+TD2 from the signal F for the number one distributor.

Figure 18:
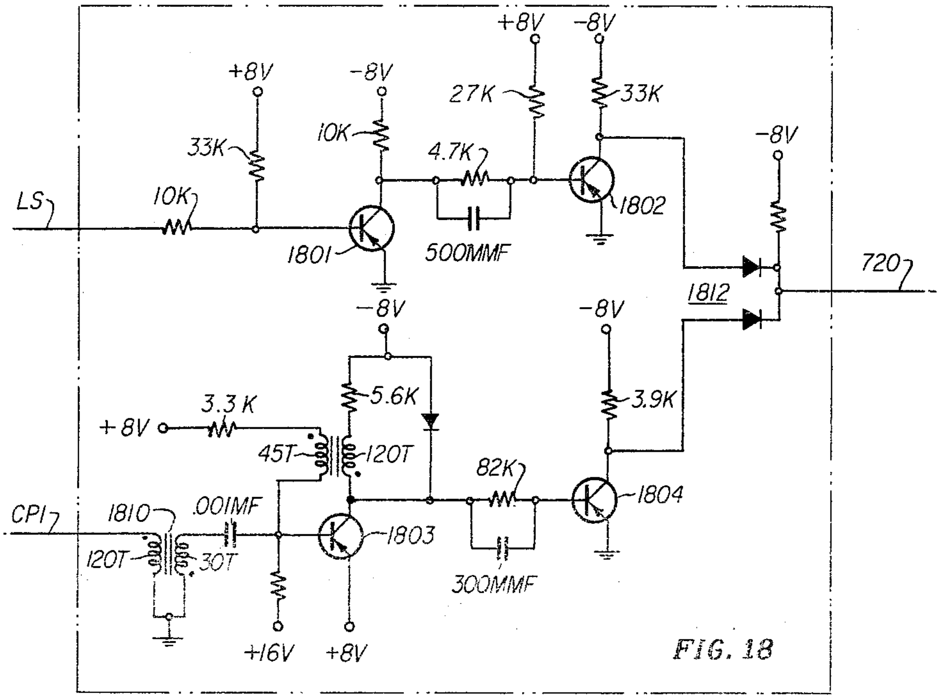

The LS generator 1800 of the central office unit 700 is shown in schematic diagram in FIG. 18. The signals on lead LS, which at this point are 100 microseconds in duration, in the time slots of the various line circuits which are transmitting ringing signals to a called line, are coupled through two amplifier stages comprising transistor 1801 and 1802 to one input of a gate 1812. A blocking oscillator comprising transistor 1803 is triggered by the trailing edge of the pulses on lead CP1 to generate ten-microseconds output pulses. This pulse is amplified in transistor 1804 and applied as the other input of gate 1812. The output signal from gate 1812 to lead 720 is supplied through OR gate 2001 to the LS/LT transmitter 2002.

Figure 7:
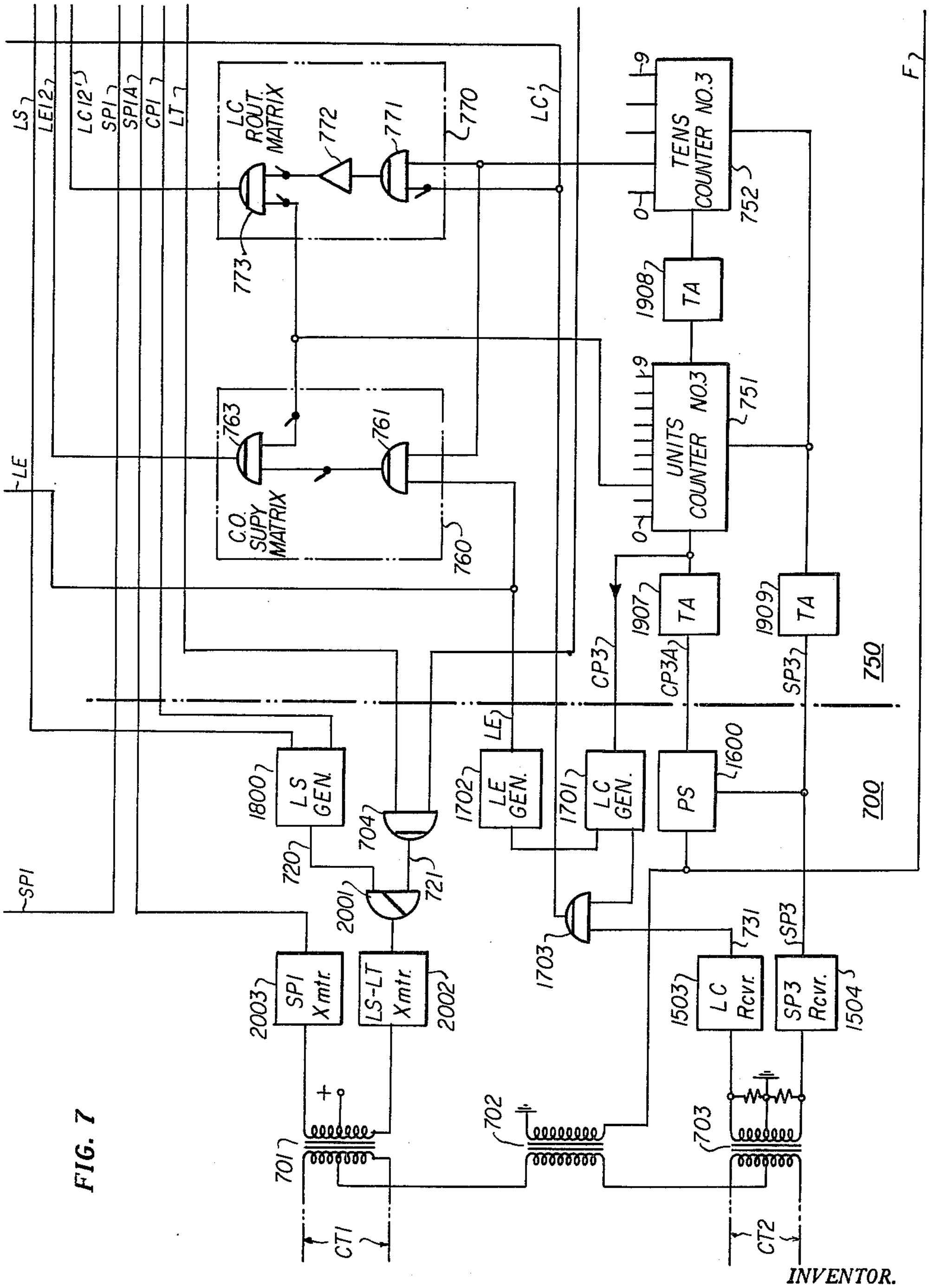

As shown in FIG. 7, an AND gate 704 gates the 100-microsecond pulses on lead LT from the LT test desk 890 with the 10-microsecond pulse on lead CP0 which occurs in the second half of the time slot, to supply a signal on lead 721 through OR gate 2001 to the LS/LT transmitter 2002. The graph in FIG. 22 shows the LS and LT pulses for the first time slot these being pulses LS00 and LT00. Note that during normal operation not more than one of these two pulses would ever appear in any time slot at the same time.

Figure 20:
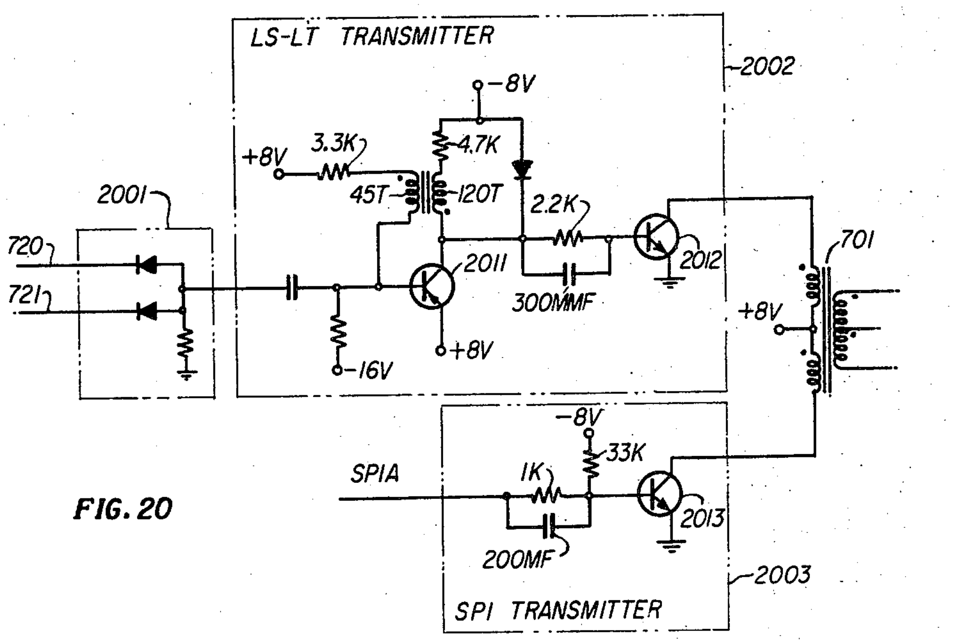

The schematic diagram of FIG. 20 shows the OR gate 2001, the LS/LT transmitter 2002, and the SP1 transmitter 2003, as well as the transformer 701 coupling these circuits to control trunk CT1. The output pulses from gate 2001 trigger a blocking oscillator comprising transistor 2011, and the output from the blocking oscillator is amplified by transistor 2012 and applied to one primary winding of transformer 701. The positive two-volt synchronization pulses appearing on lead SP1A are amplified by transistor 2013 and applied through another primary winding of transformer 701. The pulses from transistor 2012 through transformer 701 are referred to herein as positive pulses on trunk CT1, while the pulses from transistor 2013 applied through transformer 701 are referred to as negative pulses on trunk CT1.

Figure 4:
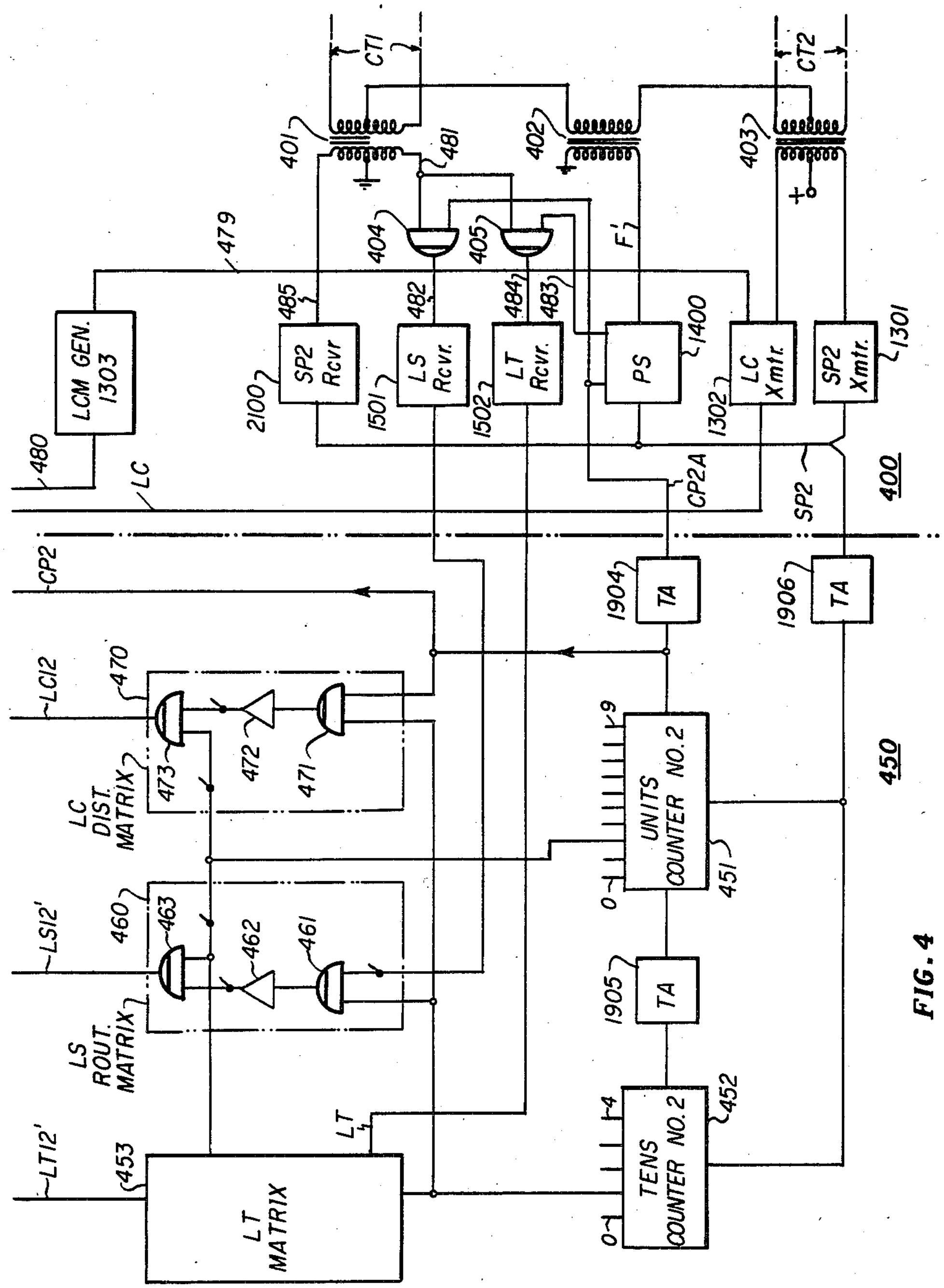

As shown in FIG. 4, the positive pulses received at the remote unit on trunk CT1 are coupled through transformer 401 to lead 481, which is one of the inputs to gates 404 and 405; while the negative pulses received on trunk CT1 are coupled through transformer 401 to the lead 485 which is an input to the SP2 receiver 2100.

Figure 21:
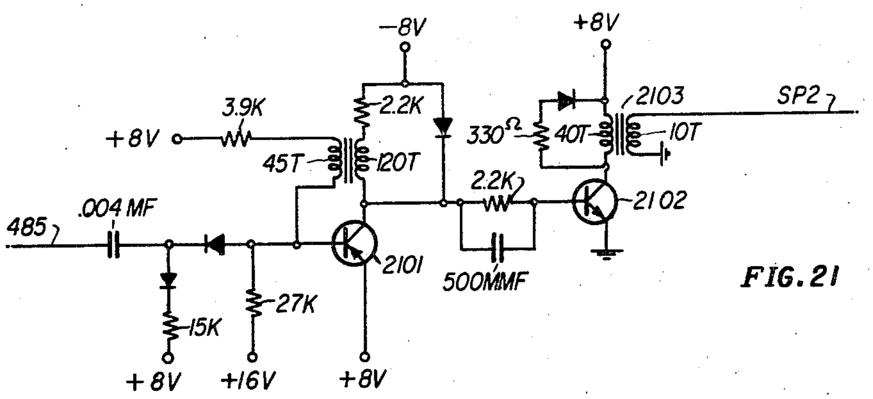

The SP2 receiver 2100 is shown by the schematic diagram of FIG. 21. The synchronization pulse received on lead 485 is reshaped by the blocking oscillator comprising transistor 2101, which drives an amplifier comprising transistor 2102. The transformer 2103 in the collector circuit of transistor 2102 supplies a ten-microsecond negative two-volt pulse to the lead SP2.

Figure 15:
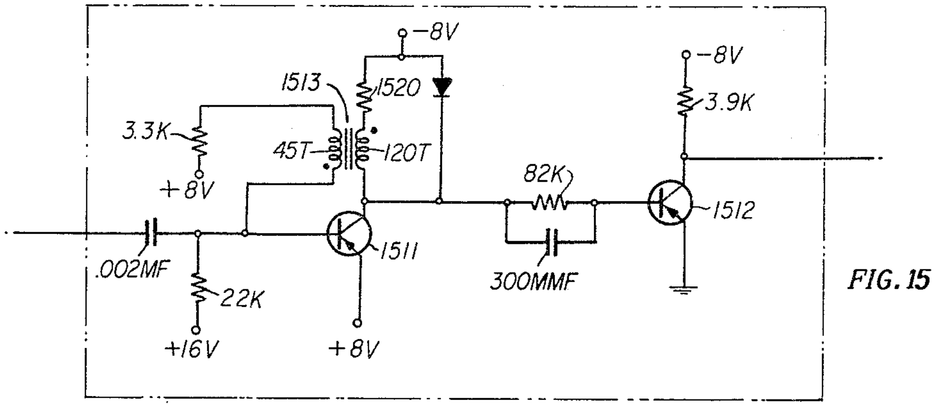

If the positive pulses on control trunk CT1 and supplied by transformer 401 to lead 481 are in the first half of a time slot they are gated by AND gate 404 to the LS receiver 1501; and if the pulses on lead 481 are in the second half of the time slot they are gated by gate 405 to the LT receiver 1502. The schematic diagram in FIG. 15 represents both the LS receiver 1501 and the LT receiver 1502. It comprises a blocking oscillator and an amplifier. The LS receiver 1501 supplies ten-microsecond output signals to lead LS′, while the LT receiver 1502 supplies ten-microsecond pulses to lead LT′ whenever a corresponding pulse appears in one of the time slots as transmitted over control trunk CT1.

Figure 13:
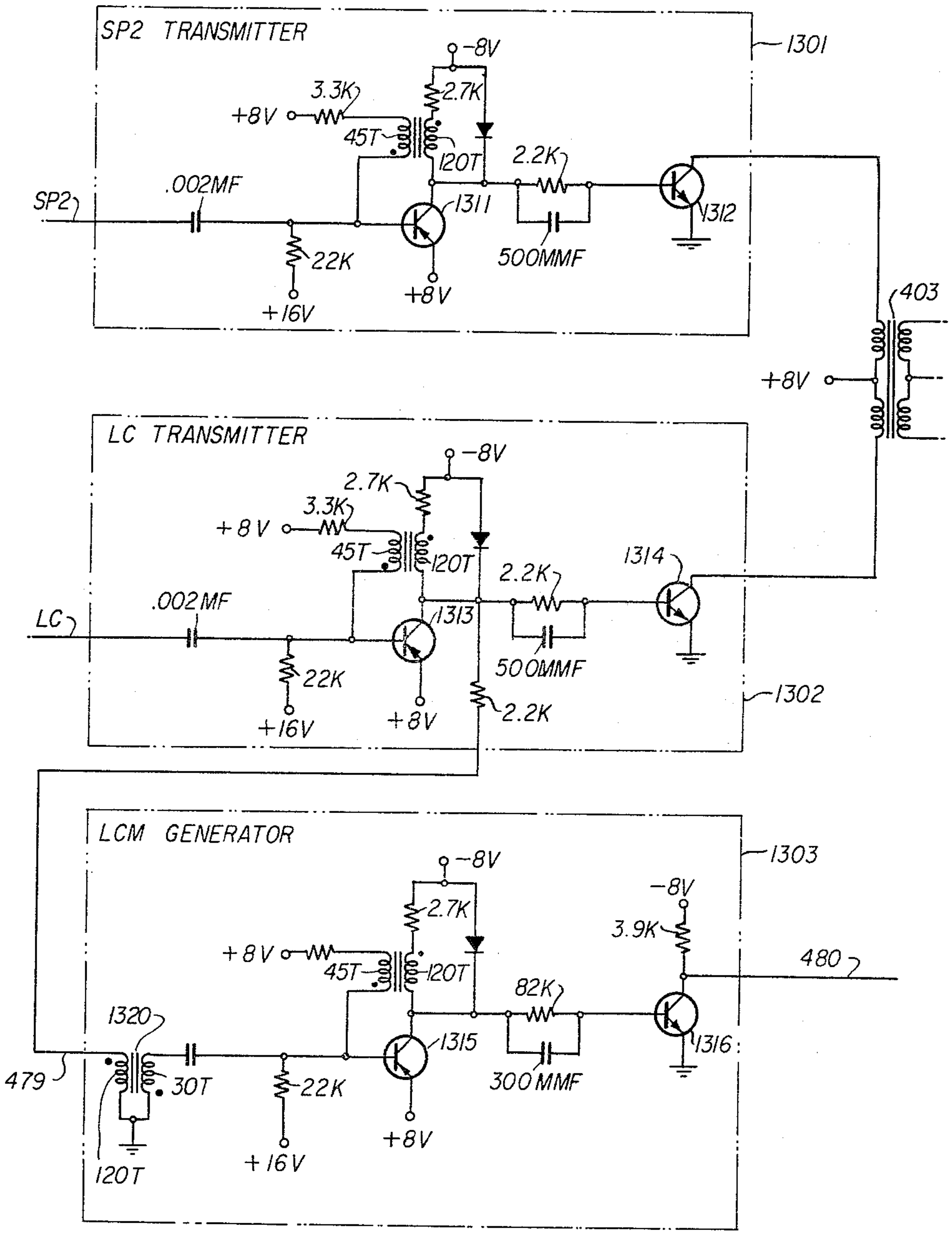

The remote unit transmitter circuits comprising the SP2 transmitter 1301 and the LC transmitter 1302 as well as the marking generator 1303 are shown by schematic diagrams in FIG. 13. The pulse on lead SP2 is re-transmitted back to the central office by transmitter circuit 1301. The pulse triggers a blocking oscillator comprising transistor 1311, the output of which is amplified by transistor 1312 and applied through transformer 403 as a pulse which is referred to as having negative polarity on trunk CT2. The signal on lead LC triggers a blocking oscillator 1313, the output of which is amplified by transistor 1314 and coupled through transformer 403 as a positive pulse on trunk CT2. In the marking pulse generator circuit 1303, a blocking oscillator comprising transistor 1315 is triggered by the trailing edge of the pulse received over lead 479 from the transistor 1313. The pulse from transistor 1313 is amplified by transistor 1316 and applied as a ten-microsecond marking pulse on lead 480 to the concentrator trunk circuits.

Referring to FIG. 7, the pulses received from trunk CT2 are coupled through transformer 703 to an LC receiver 1503 and an SP3 receiver 1504, which are circuits of the type shown by the schematic diagram of FIG. 15. The positive information pulses on trunk CT2 trigger the blocking oscillator of the LC receiver 1503, while the negative synchronization pulses on trunk CT2 trigger the blocking oscillator of the SP3 receiver 1504. The output from the LC receiver 1503 is supplied as one input to AND gate 1703, while the output from the SP3 receiver 1504 is supplied as an input to the flip flop in the phase shift unit 1600, and also to the trigger amplifier 1909 in the number 3 distributor.

Figure 17:
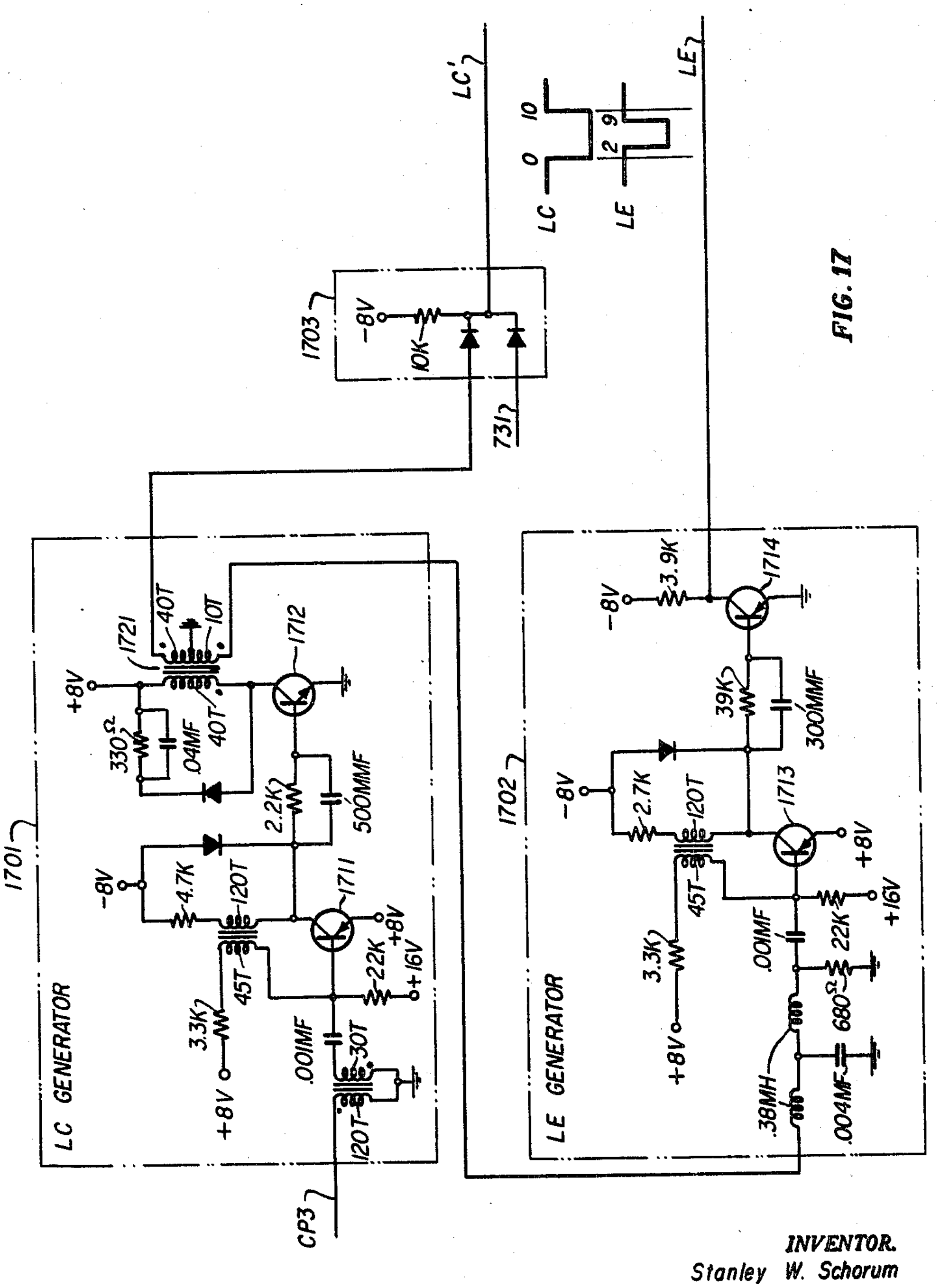

The output from the LC receiver 1503 is a 15-microsecond pulse which is supplied over lead 731 to an input of the AND gate 1703. The other input of this gate is applied from the LC generator 1701. A schematic diagram of the LC generator 1701, the LE generator 1702, and the gate 1703 is shown in FIG. 17. In the LC generator 1701 the blocking oscillator comprising transistor 1711 is triggered by the trailing edge of the pulses appearing on lead CP3. The ten-microsecond output pulse from transistor 1711 is amplified by transistor 1712 which has a three winding transformer 1721 in its collector circuit. The 40-turn winding of this transformer supplies a negative eight-volt pulse to the gate 1703, while the 10-turn winding supplies a negative two-volt pulse to a delay circuit at the input of the LE generator 1702. The pulse is delayed two microseconds and then triggers the blocking oscillator comprising transistor 1713. A seven-microsecond pulse is generated at the collector of transistor 1713, and amplified by transistor 1714, and applied to lead LE. Thus as shown by the graphs LC′ and LE in FIG. 22 the pulse on lead LC′ is a ten-microsecond pulse which overlaps the seven-microsecond pulse on lead LE. This overlapping arrangement is provided because in the expander line circuits the LC′ pulses are used to inhibit the LE pulses at the inputs of the flip flops.

*Blocking oscillators*

Most of the units used in the pulse transmission and reshaping circuits, as well as the trigger amplifiers of FIG. 19 as used in the distributors, and other circuits of the system include blocking oscillators. Each of these blocking oscillators comprises a grounded emitter transistor connection with a pulse transformer coupling its collector circuit to its base circuit, the unit being triggered by an input pulse at the base to generate an output pulse from the collector having a definite pulse width. These blocking oscillators in the various circuits must generate various width pulses, and must supply various values of load impedance. This introduces a problem, since the design of the pulse transformer and other circuit constants in each case must be tailored for the particular circuit in which it is used. According to a feature of the invention, this problem is solved by connecting a resistor in the collector circuit in series with the pulse transformer winding. The value of this resistor may then be selected to give the desired pulse width to the load involved in each circuit. For example the schematic circuit shown in FIG. 15 is used in four of the units of the pulse transmission and reshaping circuits. The blocking oscillator in FIG. 15 comprises the transistor 1511 and a pulse transformer 1513 coupling its collector to its base circuit. The resistor 1520 is connected in series with the 120-turn collector circuit winding of transformer 1513 and the negative eight-volt bias source. The value of this resistor is 1500 ohms when used in the LC receiver 1503, and 2700 ohms when used in the LS receiver 1501, the LT receiver 1502, or the SP3 receiver 1504. In FIG. 19 the value of the corresponding resistor is 3300 ohms. In the other blocking oscillators used in the system the value of the resistor is indicated.

*Signalling system summary*

The entire system for transmitting signal control pulses over the control trunks CT1 and CT2 is a 20,000-bit-per-second data transmission system. The system is designed to operate using ordinary telephone pairs for the control trunks. These control trunks introduce a substantial time delay in the propagation of the pulses. To obtain synchronization three different time bases are used one for the transmission at the central office, one for both reception and transmission at the remote unit, and the third for reception at the central office. All three time bases have the same pulse repetition rate. One feature of the invention is the transmission of the basic sine wave master signal to the remote unit over the phantom circuit of the two control trunks. These phase shifting networks are used to obtain the exact time delay difference in the time bases of the various distributors. While the phase shift units 1400 and 1600 are shown as having provision for manual adjustment of the amount of phase shift, it will be obvious to one skilled in the art that an automatic phase shifting device could be provided to compensate for the small day to day changes of the physical control pairs, such as may be produced by weather variations such as changes of humidity and temperature.

*Generalized embodiment of pulse signal transmission system*

A generalized embodiment of the time division multiplex pulse transmission system is shown by the block diagram of FIG. 23. This may represent the signal transmission system of the line concentrator shown in FIGS. 1–21, or it may represent a more general data transmission system. In this figure the transmission channels between the two locations are shown by separate lines without regard to how they are derived from the physical facility. For example the channels 2311 and 2312 correspond to the positive pulse transmission on the control trunks CT1 and CT2 of FIG. 1 respectively, the channels 2313 and 2314 correspond to the negative pulse transmission of the trunks CT1 and CT2, respectively, and the channel 2315 corresponds to the phantom derived from the two control trunks. Many other arrangements for deriving separate channels from a physical facility are known in the art.

The master sine wave signal is obtained from a generator 2301. This output signal is used directly in pulse shaper 2302 to supply a driving signal to the number 1 distributor 2304. It is transmitted over channel 2315 to the phase shift circuit 2308, in which it is shifted in phase by an amount corresponding to the propagation delay over the channel 2311 and then shaped to drive the number 2 distributor 2305. It is supplied from generator 2301 to the phase shift circuit 2307 where it is shifted in phase by an amount corresponding to the propagation delay over the total of channels 2311 and 2312, and then shaped to drive the number 3 distributor 2306. Each of the distributors thus has the same pulse repetition rate, and each has the same number of output leads to which enabling signals are supplied in successive time slots of the time division multiplex frame. To insure that the time slots of the three distributors are maintained in exact correspondence, each is reset by a synchronization pulse at the end of each frame. A counting circuit in the divider unit 2303 is driven by the signals from the pulse shaping circuit 2302. The total count of this divider is equal to the number of time slots generated by each of the distributors. In the last time slot a synchronization pulse is generated and delivered directly to the number 1 distributor 2304. This synchronization pulse is also transmitted by unit 2371 over channel 2313, and received by unit 2372 and supplied to the number 2 distributor 2305. The output pulse from unit 2372 is also re-transmitted by unit 2373 over channel 2314 and received by the unit 2374 for supply to the number 3 distributor 2306. Thus all of the distributors are reset by the synchronization pulses to start their frames together.

The enabling pulses from the respective output leads from distributor 2304 are supplied to transmission gate circuits 2321–232N. These transmission gates are supplied with information signals from the respective ones of the terminals 2305, and are arranged to sample the signals in the respective time slots and transmit them through unit 2361, over channel 2311. These time division multiplex signals are received by unit 2362 and supplied as inputs to the transmission gates 2331–233N, which are supplied with enabling pulses in their respective time slots by the signals from distributor 2305. The information signals from these terminating units 2331–233N are then supplied to the respective ones of the terminals 2306.

The number 2 distributor 2305 also supplies enabling pulses from the same output leads to terminating units 2341–234N, which are supplied with information signals on respective ones of the terminals 2307. The output signals from these terminating units are transmitted by unit 2363 over channel 2312. They are received by unit 2364 and supplied to the inputs of the terminating units 2351–235N. These terminating units are supplied with enabling pulses in the respective time slots from the number 3 distributor 2306, so that they supply output signals to respective ones of the terminals 2308.

While I have described above the principles of my invention in connection with specific apparatus, it is to be clearly understood that this description is made only by way of example and not as a limitation to the scope of my invention.

What is claimed is:

1. A time division multiplex signaling arrangement comprising first equipment at one location and second equipment at another location interconnected by transmission line means, a plurality of multiplex transmission gates and a plurality of multiplex receiving gates located in the first equipment, a plurality of multiplex transmission gates and a plurality of multiplex receiving gates located in the second equipment, a first common channel including part of said transmission line means connected in common to the transmission gates of the first equipment and the receiving gates of the second equipment, a second common transmission channel including part of said transmission line means connected in common to the transmission gates of the second equipment and the receiving gates of the first equipment, a first distributing arrangement in the first equipment connected to supply enabling pulses to the said first-equipment transmission gates in respective time slots of cyclically recurring pulse cycles, a second distributing arrangement in the second equipment connected to supply enabling pulses to both the said second-equipment transmission gates and coincidently to corresponding second-equipment receiving gates in respective time slots of cyclically recurring pulse cycles, a third distributing arrangement located in the first equipment connected to supply enabling pulses to said first-equipment receiving gates in respective time slots of cyclically recurring pulse cycles, all of said distributing arrangements having the same pulse repetition rate, a source of a master driving signals located at the first equipment, first coupling means connecting said source to said first distributing arrangement to drive it under the control of said master signals, second coupling means including said transmission line means for transmitting said master signals from said source to said second distributing arrangement to drive it, the second coupling means including an arrangement to shift the phase of said master signal in correspondence to the propagation time of pulse signals transmitted over said first channel so that the second distributing arrangement is driven in synchronism with pulses arriving at said second-equipment receiving gates; third coupling means for transmitting said master signals from said source to said third distributing means to drive it, the third coupling means including an arrangement to shift the phase of said master signal by an amount corresponding to the total propagation time from the central equipment over said first channel to the remote equipment and from the remote equipment over said second channel to the central equipment, so that the third distributing arrangement is driven in synchronism with pulse signals from said second transmission channel.

2. A universal line concentrator system comprising a central office unit, a remote unit located at a distance from the central office, a time division multiplex signalling arrangement according to claim 1, said first equipment being located at one of said units and said second equipment being located at the other of said units, a line concentrator in said remote unit, a plurality of subscriber lines terminating at said line concentrator, a line expander in said central office unit, a plurality of line terminations connected to said line expander and individually associated with said subscriber lines, a plurality of concentrator trunks less in number than said plurality of lines connected between said line concentrator and said line expander, said pluralities of transmission gates and receiving gates comprising a transmission gate and corresponding receiving gate at the central office unit individually associated with each of said line terminations, and a corresponding transmission gate and receiving gate at the remote unit individually associated with the corresponding subscriber line, means including said time division multiplex signalling arrangement for scanning said subscriber lines and said line terminations to detect service requests initiated thereat, means for selecting an idle one of said trunks, and means for operating said line concentrator and said line expander to complete a talking connection from the subscriber line corresponding to said service request through said selected trunk to the line termination associated with said subscriber line.

3. A universal line concentrator system according to claim 2, wherein each of said subscriber lines and each of said line terminations is part of a direct-current loop, and each of said concentrator trunks is isolated for direct-current from said loops, means associated with each of said subscriber lines for detecting the open and closed loop conditions, means for controlling the remote-unit transmission gate associated with each subscriber line in accordance with said detected loop condition to transmit loop-closure pulses in that line's time slot in response to a closed loop and to block the transmission of pulses in response to an open loop, said loop-closure pulses being received by the corresponding central-office receiving gate, a service request for an originating call from one of said subscriber lines being the change from an idle condition to a closed loop condition at said line, said operating means for completing a talking connection being operative at the concentrator in response to said initial detection of a closed loop condition, and at the expander in response to the initial receipt of said loop-closure pulses.

4. A universal line concentrator system according to claim 3, further including a switching device associated with each of said line terminations for opening and closing its direct-current loop, means responsive to receipt of said loop-closure pulses for causing said switching device to close its associated loop, and means responsive to the absence of loop-closure pulses in any pulse cycle for causing said switching device to open its associated loop.

5. A universal line concentrator system according to claim 4, wherein on an originating call from one of said subscriber lines, dial impulses appearing at the concentrator from the subscriber line are repeated by said time division multiplex signalling arrangement as loop-closure pulses to the expander to operate said switching device of the corresponding line termination to thereby repeat the dial pulses to that line termination, and delay means both at the concentrator and at the expander for preventing said talking connection from being released during dialing.

6. A universal line concentrator system according to claim 3, wherein the detection of service requests on a terminating call from one of said line terminations to the associated subscriber line comprises a signal on the control conductor of the line termination to control the corresponding central-office transmission gate to transmit line-seizure pulses in the corresponding time slot of said pulse cycles, means at the concentrator responsive to the receipt of said line-seizure pulses from the corresponding remote-unit receiving gate to cause ringing current from a common ringing generator to be gated to the associated subscriber line, and said operating means for completing a talking connection being operative at the concentrator in response to the loop closure upon the answering of the call and at the expander in response to the receipt of a corresponding loop-closure pulse.

7. A universal line concentrator system according to claim 6, further including a switching device associated with each of said line terminations for opening and closing its direct-current loop, means responsive to receipt of said loop-closure for causing said switching device to close its associated loop, and means responsive to absence of loop-closure pulses in any pulse cycle for causing said switching device to open its associated loop, clamping means including diodes connected to the loop to conduct on a terminating call in response to ringing current of either polarity applied to the line termination to cause the disconnection of the ringing current from that line termination, thereby protecting said switching device from damage by said ringing current.

8. A universal line concentrator system according to claim 7, wherein said switching device comprises a transistor having emitter, base and collector electrodes, a diode bridge so connecting the emitter-base path of the transistor to the line termination that the direct-current polarity across the transistor is independent of the direct-current polarity applied to the line termination.

9. A universal line concentrator system according to claim 2, wherein said means for selecting an idle one of said trunks comprises a chain circuit including associated with each trunk a chain-in OR gate and a chain-out AND gate, with the output of each chain-out gate connected to an input of the chain-in gate of the succeeding trunk, a common trunk distributor comprising a cyclic counter having a counting stage per trunk. the chain-in gate of each trunk having one input connected to an individual output of the trunk distributor, means for applying input signals which are spaced by a given interval to the trunk distributor to advance the distributor at the beginning of each such interval, with the distributor remaining at each stage for the complete interval irrespective of whether the trunk associated with that stage is idle or busy; means associated with each trunk for detecting and indicating whether it is idle or busy, means associated with each trunk responsive to a signal from its chain-in gate and an idle indication for marking that trunk as selected, and means responsive to a busy indication and an output signal from the chain-in gate for enabling the chain-out gate to thereby supply a signal to the chain-in gate of the succeeding trunk.

10. A universal line concentrator system according to claim 9, wherein said means for completing a talking connection comprises a coordinate matrix of crosspoint switching devices at the concentrator for connecting said subscriber lines to said trunks, and other coordinate matrix of crosspoint switching devices for connecting the trunks to said line terminations at the expander, each of the crosspoint devices drawing bias current when operated, said means for detecting a busy condition of a trunk comprising a transistor having emitter, base, and collector electrodes connected in each trunk circuit with its emitter-base collector path in series with the expander crosspoint devices associated with that trunk, and said means for indicating the busy condition is responsive to the current flow in said transistor.

11. A universal line concentrator system according to claim 10, further including an all-trunks busy circuit common to all of said trunks having an input from each of the trunks to apply a signal thereto in response to said busy indication, and means responsive to the all-trunks busy signal from all trunks for producing an output all-trunks busy signal; and wherein said given interval for the trunk distributor is one said pulse cycle.

12. A universal line concentrator system according to claim 9, further including means for transmitting the identity of the one marked trunk from the expander to the concentrator to mark the same trunk at the concentrator, and means at the concentrator responsive to no trunk being marked for generating an all-trunks busy signal and supplying it to circuits associated with all of said subscriber lines.

13. A universal line concentrator system according to claim 12, wherein the means for transmitting the identity of the marked trunk includes a transmission circuit derived from the simplex circuits of some of said concentrator trunks, the transmission means comprises means for translating the identity of the marked trunk into coded form, and the receiving means includes means for decoding said identity at the concentrator.

14. A universal line concentrator system according to claim 13, wherein each said simplex circuit of a concentrator trunk includes a transformer center tap at the central office and a corresponding transformer center tap at the remote unit, certain of said concentrator trunks having associated therewith at the central office a transistor having emitter, base and collector electrodes, with the emitter electrode connected to the central office center tap, the collector electrode connected to a source of bias potential, and the base electrode connected from an encoding circuit; another of the concentrator trunks having its respective center tap connections to reference points at the central office and remote unit, each of said simplex circuits which has a transistor connected to its central office center tap, having its remote unit center tap connected through a resistor to said reference point, and the marked trunk indicator receiving circuit being connected from said resistors.

15. A time division multiplex signalling arrangement comprising central equipment and remote equipment interconnected by transmission line means, a plurality of multiplex transmission gate circuits and a plurality of multiplex receiving gate circuits located in the central equipment, a plurality of multiplex transmission gate circuits and a plurality of multiplex receiving gate circuits located in the remote equipment, a first common channel including part of said transmission line means connected in common to the transmission gates of the central equipment and the receiving gates of the remote equipment, a second common transmission channel including part of said transmission line means connected in common to the transmission gates of the remote equipment and the receiving gates of the central equipment, a first distributing arrangement in the central equipment connected to supply enabling pulses to the said central transmission gates in respective time slots of cyclically recurring pulse cycles, a second distributing arrangement in the remote equipment connected to supply enabling pulses connected to both the said remote transmission gates and coincidently to corresponding remote receiving gates in respective time slots of cyclically recurring pulse cycles, a third distributing arrangement located in the central equipment connected to supply enabling pulses to said central receiving gates in respective time slots of cyclically recurring pulse cycles, all of said distributing arrangements having the same pulse repetition rate, a source of a master alternating-current signal located at the central equipment, a first phase shift device, a second phase shift device, means connecting said source to said first distributing arrangement to drive it under the control of said master signal, means for transmitting said master signal from said source over said transmission line means and through said first phase shift device to said second distributing arrangement to drive it, said first phase shift device being arranged to shift the phase of said master signal in correspondence to the propagation time of pulse signals transmitted over said first channel so that the second distributing arrangement is driven in synchronism with pulses arriving at said remote receiving gates; means coupling said master signal from said source through said second phase shift device to said third distributing means to drive it, the second phase shift device being arranged to shift the phase of said master signal by an amount corresponding to the total propagation time from the central equipment over said first channel to the remote equipment and from the remote equipment over said second channel to the central equipment, so that the third distributing arrangement is driven in synchronism with pulse signals from said second transmission channel at said central receiving gates.

16. A time division multiplex arrangement according to claim 15, further including means at the central equipment for generating a synchronization pulse signal once per pulse cycle and supplying it to said first distributor, means for transmitting the synchronization pulse signal over said transmission line means to the remote equipment with a propagation time equal to that of pulse signals transmitted over said first channel, means for supplying the received synchronization pulse signal to said second distributor and also transmitting it back over the transmission line means to the central equipment and supplying it to said third distributor with a propagation time equal to that of pulse signals transmitted over said second channel, to thereby synchronize the three distributors once each pulse cycle.

17. In a communication switching system having means for selectively connecting any one of a plurality of trunks to any one of a plurality of lines, means for selecting and marking an idle one of said trunks comprising a chain circuit including associated with each trunk a chain-in OR gate and a chain-out AND gate, with the output of each chain-out gate connected to an input of the chain-in gate of the succeeding trunk, a common trunk distributor comprising a cyclic counter having a counting stage per trunk, the chain-in gate of each trunk having one input connected to an individual output of the trunk distributor, means for applying input signals which are spaced by a given interval to the trunk distributor to advance the distributor at the beginning of each such interval, with the distributor remaining at each stage for the complete interval irrespective of whether the trunk associated with that stage is idle or busy, means associated with each trunk for detecting and indicating whether it is idle or busy, means associated with each trunk responsive to a signal from its chain-in gate and an idle indication for marking that trunk as selected, and means responsive to a busy indication and an output signal from the chain-in gate for enabling the chain-out gate to thereby supply a signal to the chain-in gate of the succeeding trunk.

18. In a communication system, a line circuit terminating a normally open line which becomes closed when in calling condition, a direct-current source for feeding transmission current to said line when it is in calling condition, said source having one pole connected in series with a first inductor to one side of the line, switching means in series with a second inductor connected between the other side of the line and the other pole of the source, said switching means normally presenting a high impedance to effectively disconnect said other pole from said other side of the line, call-detecting means including a connection to a source of signal potential connected to said other side of the line, means included in the said call-detecting means for detecting signalling current flow over the line in response to the closure thereof to cause said switching means to complete a low impedance path from said other pole to said other side of the line and to transmit a call signal to control equipment.

19. In a communication system, the combination as claimed in claim 18, further including a sensing resistor connected in series with said switching means between said other pole and said other side of the line, a connection from a point on the sensing resistor to said control equipment for the transmission of said call signal, means for producing a first potential at said point responsive to the open condition of the line, and a second potential in response to the closed condition of the line, the second potential being said call signal.

20. In a communication system, the combination as claimed in claim 19, further including means for applying ringing current to said line to signal a station on said line, and wherein a diode is connected in series with said switching means and said sensing resistor between said other pole and said other side of the line to block the ringing current from said switching means, and another diode connected to block ringing current from said call-detecting means.

21. In a communication system, the combination as claimed in claim 20, wherein an interrupter controls said ringing current to have ringing intervals and silent intervals alternately, a line signal gate having one input connection which is said connection from the said point of said sensing resistor, and another input connection from the interrupter to block the line signal gate during said ringing intervals, and an output connection from the line signal gate to said control equipment.

References Cited by the Examiner

UNITED STATES PATENTS

| | | | |
|---|---|---|---|
| 2,916,557 | 12/59 | Fleckenstein | 179—18 |
| 2,921,139 | 1/60 | Krom | 179—18 |
| 2,957,949 | 10/60 | James et al. | 179—18 |
| 2,976,367 | 3/61 | Bruce | 179—18 |
| 3,022,382 | 2/62 | Ewin | 179—18 |
| 3,033,937 | 5/62 | Jones | 179—18 |
| 3,036,161 | 5/62 | Cirone et al. | 179—18 |
| 3,099,717 | 7/63 | Harr et al. | 179—18 |
| 3,114,007 | 12/63 | Cirone et al. | 179—18 |

ROBERT H. ROSE, *Primary Examiner.*

WALTER L. LYNDE, *Examiner.*